US012716016B2

(12) United States Patent
Nakamura

(10) Patent No.: US 12,716,016 B2
(45) Date of Patent: Aug. 25, 2026

(54) ADHESIVE COMPOSITION, AND RESIN MATERIAL, RUBBER ARTICLE, ORGANIC FIBER-RUBBER COMPOSITE, AND TIRE USING SAME

(71) Applicant: BRIDGESTONE CORPORATION, Tokyo (JP)

(72) Inventor: Masaaki Nakamura, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 291 days.

(21) Appl. No.: 18/269,201

(22) PCT Filed: Nov. 10, 2021

(86) PCT No.: PCT/JP2021/041410

§ 371 (c)(1),
(2) Date: Jun. 22, 2023

(87) PCT Pub. No.: WO2022/137861

PCT Pub. Date: Jun. 30, 2022

(65) Prior Publication Data

US 2024/0150628 A1 May 9, 2024

(30) Foreign Application Priority Data

Dec. 23, 2020 (JP) ................................ 2020-214237

(51) Int. Cl.

| | |
|---|---|
| ***C09J 109/10*** | (2006.01) |
| ***C09J 11/06*** | (2006.01) |
| ***C09J 11/08*** | (2006.01) |

(52) U.S. Cl.

CPC ............ *C09J 109/10* (2013.01); *C09J 11/06* (2013.01); *C09J 11/08* (2013.01)

(58) Field of Classification Search

CPC .......... B60C 1/00; B60C 9/00; C08F 236/06; C08G 18/003; C08G 18/6415;

(Continued)

(56) References Cited

U.S. PATENT DOCUMENTS

| | | |
|---|---|---|
| 2,128,229 A | 8/1938 | Hale et al. |
| 5,863,987 A | 1/1999 | Nakamura |

(Continued)

FOREIGN PATENT DOCUMENTS

| | | |
|---|---|---|
| CN | 101619128 A | 1/2010 |
| CN | 102352044 A | 2/2012 |

(Continued)

OTHER PUBLICATIONS

Katrin Schütz et al. "Characterization of phenolic acids and flavonoids in dandelion (*Taraxacum officinale* WEB. ex WIGG.) root and herb by high-performance liquid chromatography/electrospray ionization mass spectrometry," Nov. 9, 2004, Rapid Communications in Mass Spectrometry, 2005; 19: 179-186. (Year: 2004).*

(Continued)

*Primary Examiner* — Michael N Orlando
(74) *Attorney, Agent, or Firm* — Sughrue Mion, PLLC

(57) ABSTRACT

To provide an adhesive composition that can ensure a desired adhesion property without using resorcin and that does not impair workability during use, as well as a resin material, a rubber article, an organic fiber-rubber composite, and a tire using the adhesive composition. Provided is an adhesive composition containing (A) a rubber latex with unsaturated diene and (B) polylysine. Also provided are a resin material, a rubber article, an organic fiber-rubber composite, and a tire using this adhesive composition.

18 Claims, 4 Drawing Sheets

(58) Field of Classification Search

CPC .............. C08G 18/6492; C08G 18/706; C08G 18/7664; C08G 18/8067; C08G 18/8074; C08G 18/8077; C08G 2170/80; C08G 2380/00; C09J 109/08; C09J 109/10; C09J 11/06; C09J 11/08; C09J 175/04; C09J 197/005; C09J 199/00; D06M 13/11; D06M 13/152; D06M 13/238; D06M 13/395; D06M 15/15; D06M 15/564; D06M 15/693; D06M 2101/32; C08L 97/005; C08L 77/00

USPC ... 156/60, 110.1, 324, 325, 326, 327, 330.9, 156/331.8, 331.9, 178, 307.5, 910; 428/221, 375; 152/564

See application file for complete search history.

(56) References Cited

U.S. PATENT DOCUMENTS

| | | | |
|---|---|---|---|
| 2007/0282062 | A1 | 12/2007 | Dorr et al. |
| 2010/0215965 | A1 | 8/2010 | Tadaki et al. |
| 2014/0235124 | A1 | 8/2014 | Doisneau et al. |
| 2016/0251550 | A1 | 9/2016 | Michoud et al. |
| 2018/0118983 | A1 | 5/2018 | Doisneau et al. |

FOREIGN PATENT DOCUMENTS

| | | | | | |
|---|---|---|---|---|---|
| CN | 104231998 | A | | 12/2014 | |
| CN | 105505266 | A | | 4/2016 | |
| CN | 107033833 | A | | 8/2017 | |
| CN | 107602944 | A | | 1/2018 | |
| CN | 107903843 | A | | 4/2018 | |
| CN | 108084941 | A | * | 5/2018 | .............. C09J 11/06 |
| EP | 2 426 353 | A1 | | 3/2012 | |
| JP | 09-12997 | A | | 1/1997 | |
| JP | 2005-263887 | A | | 9/2005 | |
| JP | 2006-037251 | A | | 2/2006 | |
| JP | 2011-241402 | A | | 12/2011 | |
| JP | 2016-528337 | A | | 9/2016 | |
| JP | 2020-122066 | A | | 8/2020 | |
| WO | 97/13818 | A1 | | 4/1997 | |
| WO | 2008/149787 | A1 | | 12/2008 | |
| WO | WO-2010150673 | A1 | * | 12/2010 | ........... C08G 18/678 |
| WO | 2013/017421 | A1 | | 2/2013 | |
| WO | WO-2015025776 | A1 | * | 2/2015 | ........... C08G 18/287 |
| WO | 2018/003572 | A1 | | 1/2018 | |

OTHER PUBLICATIONS

Hirokazu Hakata, "Rosin Modified Phenolic Resin", Network Polymer, Jul. 1, 2010, vol. 31, No. 5.

International Search Report of PCT/JP2021/041410 dated Feb. 1, 2022 [PCT/ISA/210].

European Search Report dated Jul. 1, 2024 in Application No. 21910015.3.

Fermented Food Technology, 1st Edition, edited by Hou Hongping, China Agricultural University Press, 2016, pp. 300-302 (13 pages total).

Communication dated Jun. 11, 2025, issued in Chinese Application No. 202180086534.9.

* cited by examiner

ADHESIVE COMPOSITION, AND RESIN MATERIAL, RUBBER ARTICLE, ORGANIC FIBER-RUBBER COMPOSITE, AND TIRE USING SAME

CROSS REFERENCE TO RELATED APPLICATIONS

This application is a National Stage of International Application No. PCT/JP2021/041410, filed Nov. 10, 2021, claiming priority to Japanese Patent Application No. 2020-214237, filed Dec. 23, 2020.

TECHNICAL FIELD

The present invention relates to an adhesive composition and a resin material, a rubber article, an organic fiber-rubber composite, and a tire using the adhesive composition.

BACKGROUND ART

Conventionally, for the purpose of reinforcing a rubber article such as a tire, an organic fiber such as a tire cord made of a nylon fiber or a polyester fiber is bonded to a rubber composition such as a tire rubber composition to form an organic fiber-rubber composite. For such a bonding, a method in which an organic fiber is coated with an adhesive composition, embedded in a rubber composition, and co-vulcanized with the rubber composition is generally used.

In a process of coating the organic fiber with the adhesive composition, a solvent is generally used to adjust the viscosity of the adhesive composition, but since the solvent volatilizes in the process, it is preferable to use water, which has less environmental impact, as the solvent. Furthermore, when the organic fiber is coated with the adhesive composition by dipping, the viscosity of the adhesive composition needs to be low enough to allow application by dipping.

In general, a component in a water-based adhesive composition that is aqueous, i.e., a component that has the property of being dissolvable or dispersible in water, must have a polar molecular structure. However, on the other hand, a polymeric material such as a rubber, an organic fiber base material, or the like, which serves as an adherend, has low polarity, and when the difference between the polarity of the surface of a rubber or an organic fiber base material and the polarity of a component contained in an adhesive composition becomes large, adhesion becomes difficult. Therefore, in order to use the water-based adhesive composition as an adhesive composition for rubber articles, a component contained in the water-based adhesive composition needs to have a polarity due to its aqueous nature, while on the other hand, the polarity of the component needs to be controlled in such a manner that the polarity does not decrease adhesion property due to the difference between the polarity of the component and the polarity of an adherend. Therefore, a water-based adhesive composition with a function that can satisfy both of these conflicting requirements is suitably used.

With respect to the process of coating the organic fiber with the adhesive composition, an example of the process when an organic fiber cord such as a tire cord is dipped in an adhesive composition is described by way of FIG. 1.

An organic fiber cord 1 is unwound from an unwinding roll, transported by the roll, and dipped into an adhesive composition 2 in an immersion bath (dipping tank) 3 filled with the adhesive composition 2. An organic fiber cord 4 coated with the adhesive composition 2 is pulled up from the immersion bath 3, and an excess portion of the adhesive composition 2 is removed by a squeezing roll 5. The organic fiber cord 4 coated with the adhesive composition 2 is then further conveyed by the roll, dried at a drying zone 6, subjected to thermosetting of the resin while being stretched by application of tension at a hot zone 7, subjected to thermosetting of the resin while being standardized (normalized) with the tension precisely adjusted to achieve a desired strong elongation physical property at a normalizing zone 8, cooled by air outside the zone, and then wound up on a take-up roll. In this way, the organic fiber is coated with the adhesive composition.

As the adhesive composition, an RFL (resorcin-formaldehyde-latex) adhesive composition obtained by aging a mixture of resorcin, formaldehyde, and rubber latex, or an adhesive composition in which a specific adhesion promoter is mixed with this RFL adhesive composition, has conventionally been used (See Patent Documents 1 to 4).

As is well known, an adhesive composition composed of a water-based phenolic resin obtained by mixing and aging a water-dispersible rubber latex component, and resorcin and formaldehyde which are water-soluble (Patent Document 1) has been widely used in the rubber industry worldwide since such a composition was found to have a function of both an adherence to a rubber as an adherend and to a less polar substrate surface, such as organic fibers. In bonding using the RFL adhesive composition, bonding is performed by co-vulcanization with an adhered rubber side by a rubber latex component, while bonding is performed with an adhered base material side by a phenolic resin component composed of a condensate of resorcin and formaldehyde that has an adhesion property with an organic fiber base material.

The reason why resorcin is preferably used here is that a phenolic condensation resin that is a resin type with a high adhesion property with an adherend can be provided and that a resin component in which a polar functional group introduced into a phenol ring to obtain water solubility is a hydroxyl group with relatively small polarity that is difficult to become a steric hindrance and has a high adhesive property to an organic fiber base material side can be provided.

The RFL adhesive composition is obtained by mixing and aging resorcin, formaldehyde, and rubber latex using rosin acid or the like as an emulsifier during polymerization in the presence of a basic composition. It is speculated that this causes water-soluble resorcin and formaldehyde to condense in a resol-type condensation reaction under a base (see Patent Document 2) and that rosinic acid on the latex surface addition-condenses with a methylol group at an end of a resol-type phenol-formaldehyde addition-condensation product (see Non-patent Document 1).

Such aging allows a latex to cross-link with a resol-type resorcin-formaldehyde condensate via rosinic acid, strengthening adhesion, and the latex becomes an encapsulated protective colloid complexed with an aqueous resin, and when an adhesive composition is processed in an apparatus as illustrated in FIG. 1, the rubber tackiness of the latex is suppressed, resulting in less contamination due to adhesion of the adhesive composition to the apparatus.

An adhesion promoter that is aqueous, i.e., has the property of being dissolvable or dispersible in water has been used as an adhesion promoter to be added to the RFL adhesive composition to improve adhesion to the surface of a substrate with less polarity, such as organic fiber cord material, by means of a water-based adhesive composition.

As the adhesion promoter that is water-dispersible, a (blocked) isocyanate (see Patent Document 3) such as methylene diphenyl diisocyanate with a particle size of from 0.01 to 0.50 μm, a water-dispersed particle (See Patent Document 4) of a non-water soluble, phenolic novolac-type resin such as a cresol novolac-type multifunctional epoxy resin, or the like, is used.

As the adhesion promoter containing a water-soluble group, a sodium hydroxide solution of a novolac-type condensate obtained by a novolacification reaction of resorcin and formaldehyde (see Patent Document 5), a phenolic resin dissolved in water in the presence of a basic substance such as an ammonium solution of a novolac-type condensate of a chlorophenol and formaldehyde (see Patent Document 5), an aqueous urethane compound including a (thermally dissociable blocked) isocyanate group and a self-water-soluble group (see Patent Document 6), or the like is used in combination with an RFL adhesive composition.

In recent years, however, there has been a growing demand to reduce the use of resorcin, which has been used as a water-soluble component in an RFL adhesive composition, from the viewpoint of reducing environmental impact.

To address this problem, a variety of adhesive compositions for a water-solvent system using a resorcin-free polyphenol have been studied and proposed.

For example, an adhesive composition for an organic fiber composed of rubber latex and a lignin resin (see Patent Document 7), a water-based adhesive composition based on rubber latex and a polyphenol such as a flavonoid and an aromatic polyaldehyde (see Patent Documents 8 and 9), or the like is known as a resorcin- and formaldehyde-free adhesive composition.

RELATED ART DOCUMENTS

Patent Documents

[Patent Document 1] U.S. Pat. No. 2,128,229A
[Patent Document 2] JP 2005-263887A
[Patent Document 3] JP 2006-37251A
[Patent Document 4] JP H09-12997A
[Patent Document 5] WO 97/013818
[Patent Document 6] JP 2011-241402A
[Patent Document 7] WO 2018/003572
[Patent Document 8] WO 2013/017421
[Patent Document 9] JP 2016-528337A

Non-Patent Document

[Non-patent Document 1] Hirokazu Hakata, Network Polymer Vol. 31, No. 5, p. 252 (2010)

SUMMARY OF THE INVENTION

Problems to be Solved by the Invention

However, when an adhesive composition obtained by simply mixing rubber latex and a lignin resin, as described in Patent Document 7, is used as a resorcin-free adhesive composition, the mechanical stability of an adhesive liquid under shear strain is lowered due to the high tackiness of the rubber latex. Therefore, for example, in the process of coating the organic fiber cord 1 with the adhesive composition 2 and drying and thermosetting the cord as illustrated in FIG. 1, the adhesion of the adhesive composition 2 to the squeezing roll 5, a roll in the drying zone 6, and the like increases, resulting in a new problem of poor workability of the process.

Such an adhesive composition that does not contain resorcin and formalin is likely to have a lower adhesion property due to the surface of an adhesive coating being roughened by adhesion to the device, and furthermore, cross-linking between a latex component and a resorcin-formaldehyde condensate is not obtained, resulting in a lower adhesion property between an organic fiber and a coating rubber composition compared to a conventional RFL adhesive composition in the first place, which has also been a problem.

Still further, as described in Patent Document 8, when polyphenol mixed with rubber latex is mixed with aromatic dialdehyde such as terephthalaldehyde or 2,5-furandicarboxaldehyde, which have low solubility in water, to produce a water-based adhesive composition, the aromatic dialdehyde is difficult to dissolve in water during production, which was insufficient in terms of workability.

Still further, a resorcin-free adhesive composition as described above also had the problem of reducing the cord strength of an organic fiber cord coated with the adhesive composition.

Accordingly, an object of the present invention is to provide an adhesive composition that can ensure a desired adhesion property without using resorcin and that does not impair workability during use, as well as a resin material, a rubber article, an organic fiber-rubber composite, and a tire using the adhesive composition.

Means for Solving the Problems

In order to solve the above-described problems, the present inventor has conducted a series of diligent studies on the composition of an adhesive composition. As a result, the present inventor found that by blending polylysine with a predetermined rubber latex, a desired adhesive property can be secured without using resorcin, and an adhesive composition that does not impair workability during use can be obtained, thereby completing the present invention.

In other words, the adhesive composition of the present invention is characterized by containing (A) a rubber latex with unsaturated diene and (B) polylysine.

Here, the (B) polylysine is a low molecular weight natural homopolymer composed of L-lysine, an essential amino acid, as a monomer, linked in a chain by a peptide bond, which reacts with a polyphenol via a covalent bond using an oxidase catalyst. The (B) polylysine is usually made as a homo-oligopeptide of about from 25 to 30 L-lysine residues, contains a hydrophilic amino group, and is a positively charged amino acid molecule in water.

The resin material of the present invention is characterized in that the surface of a resin base material is coated by an adhesive layer composed of the adhesive composition. In particular, such a material can be preferably used as a rubber-to-resin adhesive composition.

The rubber article of the present invention is characterized by being reinforced by the resin material.

The organic fiber-rubber composite of the present invention is an organic fiber-rubber composite of an organic fiber, such as a tire cord made of a nylon fiber, a polyester fiber, or the like, and rubber, characterized in that the organic fiber is coated with the adhesive composition.

The tire of the present invention is characterized by using the organic fiber-rubber composite, in particular, an organic fiber cord-rubber composite.

Effects of the Invention

According to the present invention, an adhesive composition that can ensure a desired adhesion property without using resorcin and does not impair workability during use, as well as a resin material, a rubber article, an organic fiber-rubber composite, and a tire using the adhesive composition can be provided.

MODE FOR CARRYING OUT THE INVENTION

Figure 1:
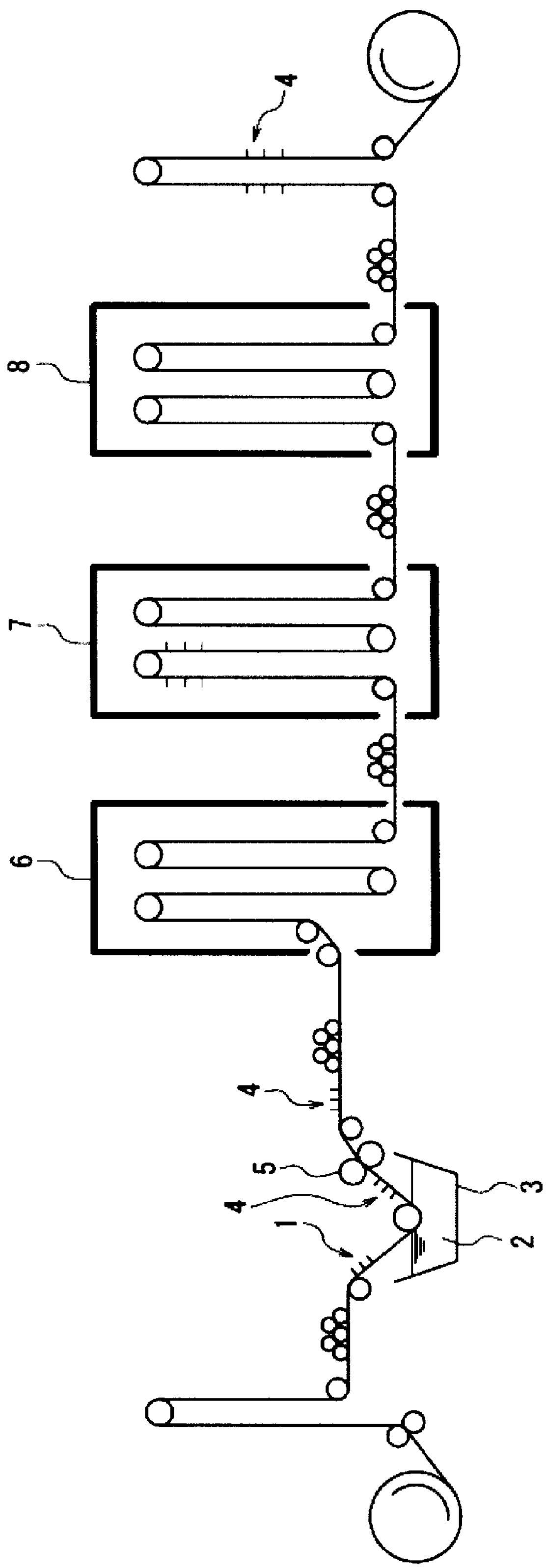
FIG. 1 is a schematic diagram illustrating an example of a process of coating an organic fiber cord with an adhesive composition by means of an immersion treatment.

Hereinafter, the adhesive composition, resin material, rubber article, organic fiber-rubber composite, and tire of the present invention will be described in detail by way of embodiments. These descriptions are intended to illustrate the present invention and are not intended to limit the invention in any way.

When a range is expressed herein, the ends of the range are also meant to be included within the range, unless otherwise stated. [Adhesive Composition] The adhesive composition of the present invention contains (A) a rubber latex with unsaturated diene and (B) polylysine.

According to the adhesive composition of the present invention, the above-described configuration can ensure favorable adhesion, in particular, an adhesion property between an organic fiber and a coating rubber composition, without the use of resorcin. In the adhesive composition of the present invention, (A) a rubber latex with unsaturated diene contributes to the improvement of an adhesion property. The use of (B) polylysine suppresses the tackiness of the rubber latex, measured as the mechanical stability of an adhesive liquid under shear strain, and thus adhesion of the adhesive composition to a roll or the like can be suppressed, in particular, in a process of coating an organic fiber with an adhesive composition and drying and thermosetting the composition, resulting in favorable workability. Therefore, according to the adhesive composition of the present invention, a desired adhesion property can be obtained without the use of resorcin, and favorable workability at the time of use can also be ensured. According to the adhesive composition of the present invention, the environmental burden can be reduced because resorcin is not required. Furthermore, addition of the (B) polylysine to an adhesive composition has an effect of extending the usable period as an adhesive due to the antimicrobial action of the adhesive composition.

Accordingly, the adhesive composition of the present invention may be resorcin-free. The adhesive composition of the present invention is preferably free of formaldehyde.

The adhesive composition of the present invention is particularly useful when applied to an organic fiber cord, as described below.

<(A) Rubber Latex Having Unsaturated Diene>

In the adhesive composition of the present invention, examples of the (A) rubber latex with unsaturated diene include (A-1) a synthetic rubber latex with unsaturated diene and (A-2) a natural rubber latex.

The (A-1) synthetic rubber latex with unsaturated diene in the adhesive composition of the present invention means synthetic rubber latex containing unsaturated diene with vulcanization by sulfur.

An example of the principle of an action exhibited by the (A-1) synthetic rubber latex with unsaturated diene contained in the adhesive composition in one embodiment of the present invention will be described with reference to FIGS. 2 and 3. A synthetic rubber latex 11 with unsaturated diene is a component for bonding an adhesive layer 32 consisting of the adhesive composition 2 and an adherend thereof, a coating rubber composition 33. The synthetic rubber latex 11 with unsaturated diene is compatible with a rubber polymer contained in the coating rubber composition 33, which is the adherend, and furthermore, the unsaturated diene moiety co-vulcanizes to form rubber co-vulcanization adhesion 21. As a result, the adhesive composition of the present invention containing the (A-1) synthetic rubber latex with unsaturated diene can provide favorable adhesion between, for example, an organic fiber cord and a coating rubber composition.

The (A-1) synthetic rubber latex with unsaturated diene may include, without limitation, styrene-butadiene copolymer rubber latex, vinylpyridine-styrene-butadiene copolymer rubber latex, carboxyl group modified styrene-butadiene copolymer rubber latex, nitrile rubber latex, and chloroprene rubber latex. These may be used singly, or two or more kinds thereof may be used in combination.

Among the rubber latex, vinylpyridine-styrene-butadiene copolymer rubber latex is preferable. Vinylpyridine-styrene-butadiene copolymer rubber latex is a rubber latex that has been widely used in adhesive compositions and articles such as tires, and in the adhesive composition of the present invention, such a rubber latex provides favorable bonding between an adhesive layer and an adhered rubber, which is because an advantage of a relatively soft and flexible nature also allows the adhesive layer to involve deformation of an organic fiber cord without splitting.

The content (solid content ratio) of the (A-1) synthetic rubber latex with unsaturated diene in the total solid content of the adhesive composition of the present invention is not particularly limited, and is preferably 25% by mass or more, more preferably 40% by mass or more, and still more preferably 50% by mass or more. The content of the (A-1) synthetic rubber latex with unsaturated diene is preferably 95% by mass or less, and more preferably 90% by mass or less. When the content of the (A-1) synthetic rubber latex with unsaturated diene is 25% by mass or more, the compatibility between rubber polymers in an adhered rubber composition and a rubber latex in an adhesive composition becomes more suitable, and the adhesion state of coating rubber in an organic fiber-rubber composite is more excellent. On the other hand, when the content of the (A-1) synthetic rubber latex with unsaturated diene is 95% by mass or less, the amount of a resin component contained as another component in the adhesive composition can be secured above a certain relative level, and as a result, cohesive breakdown resistance of an adhesive layer is sufficiently secured and breakdown in the adhesive layer is hardly occurred, resulting in obtaining sufficient adhesion property.

The (A-1) synthetic rubber latex with unsaturated diene can be obtained, for example, by dissolving an emulsifier such as potassium rosinic acid in water, adding a mixture of monomers thereto, adding an electrolyte such as sodium phosphate and a peroxide or the like as a polymerization initiator, polymerizing, and then, after reaching a predetermined conversion ratio, adding a charge transfer agent to stop the polymerization, and then removing the remaining monomer. During polymerization, a chain transfer agent is also preferably used.

As the emulsifiers, one or more kinds of: an anionic surfactant such as an alkali metal salt of a fatty acid, an alkali metal salt of rosinic acid, sodium formaldehyde condensed naphthalene sulfonate, a sulfate of a higher alcohol, an alkyl benzene sulfonate, or an aliphatic sulfonate; or a nonionic surfactant such as polyethylene glycol of alkyl ester type, alkyl ether type, or alkyl phenyl ether type are used.

Among these emulsifiers, it is preferable to include a metal salt of rosinic acid, especially an alkali metal salt of rosinic acid, which can be used singly, i.e., in one kind only, or in combination with two or more other emulsifiers. A rosinic acid is a mixture of resin acids with a very similar chemical structure, composed mainly of tricyclic diterpenes obtained from pine sap or the like. These resin acids have three ring structures, two double bonds, and one carboxyl group, and the double bond portion has a highly reactive functional group that esterifies with a methylol end of an unsaturated carboxylic acid or a resol phenolic resin at a carboxyl group portion.

The amount of such an emulsifier used with respect to 100 parts by mass of all monomer used in latex polymerization is usually from 0.1 to 8 parts by mass, and preferably from 1 to 5 parts by mass.

As the polymerization initiator, a water-soluble initiator such as potassium persulfate, sodium persulfate, or ammonium persulfate, a redox initiator, or an oil-soluble initiator such as benzoyl peroxide can be used. Among them, potassium persulfate is preferable.

For the chain transfer agent, for example, a monofunctional alkyl mercaptan such as n-hexyl mercaptan, t-dodecyl mercaptan, n-dodecyl mercaptan, n-octyl mercaptan, n-tetradecyl mercaptan, or t-hexyl mercaptan; a bifunctional mercaptan such as 1,10-decanedithiol or ethylene glycol dithioglycolate; a trifunctional mercaptan such as 1,5,10-decanedithiol and trimethylolpropane trithioglycolate; a tetrafunctional mercaptan such as pentaerythritol tetrakisthioglycolate; a disulfide; a halogen compound such as carbon tetrachloride, carbon tetrabromide, or ethylene bromide; alpha-methylstyrene dimer, terpinolene, alpha-terpinene, dipentene, allyl alcohol, or the like can be used. These are used singly, or two or more kinds thereof are used in combination.

Preferable examples of these chain transfer agents include an alkyl mercaptan, and more preferable examples include n-octyl mercaptan and t-dodecyl mercaptan. Among them, t-dodecyl mercaptan is preferably used.

The amount of such a chain transfer agent used with respect to 100 parts by mass of all monomers used in latex polymerization is usually from 0.01 to 5 parts by mass, and preferably from 0.1 to 3 parts by mass.

In addition to the above-described components, a general-purpose additive such as an anti-aging agent such as a hindered phenol, a silicone-based, higher alcohol-based, or mineral oil-based antifoaming agent, a reaction stopper, or an anti-freeze may be used in the latex, if necessary.

<<Vinylpyridine-Styrene-Butadiene Copolymer Rubber Latex>>

The vinylpyridine-styrene-butadiene copolymer rubber latex is a ternary copolymerization of a vinylpyridine monomer, a styrene monomer, and a conjugated diene-butadiene monomer, which may further contain another monomer copolymerizable to these monomers.

The vinylpyridine monomer encompasses vinylpyridine and substituted vinylpyridine in which a hydrogen atom in the vinylpyridine is substituted with a substituent group. Examples of such a vinylpyridine monomer include 2-vinylpyridine, 3-vinylpyridine, 4-vinylpyridine, 2-methyl-5-vinylpyridine, and 5-ethyl-2-vinylpyridine, and among these, 2-vinylpyridine is preferable. These vinylpyridine monomers may be used singly, or two or more kinds thereof may be used in combination.

The styrene monomer encompasses styrene and substituted styrene in which a hydrogen atom in styrene is substituted with a substituent. Examples of the styrene monomer include styrene, α-methylstyrene, 2-methylstyrene, 3-methylstyrene, 4-methylstyrene, 2,4-diinopropylstyrene, 2,4-dimethylstyrene, 4-t-butylstyrene, and hydroxymethylstyrene, and among these Styrene is preferable. These styrene monomers may be used singly, or two or more kinds thereof may be used in combination.

Examples of conjugated butadiene monomers include an aliphatic conjugated butadiene compound such as 1,3-butadiene, and 2-methyl-1,3-butadiene, and among these, 1,3-butadiene is preferable. These conjugated butadiene monomers may be used singly, or two or more kinds thereof may be used in combination.

For synthesis of the vinylpyridine-styrene-butadiene copolymer rubber latex, a known method can be used, and specifically, for example, the method described in JP H09-78045 by the present inventors can be used. Using those methods, the same particles of vinylpyridine-styrene-butadiene copolymer rubber latex can have a variety of compositions and intraparticle structures, such as copolymers with uniform or different composition ratios.

With regard to the vinylpyridine-styrene-butadiene copolymer rubber latex, examples of a commercially available copolymer with a monomer mixing ratio of uniform composition within the same particle include Nipol 2518 manufactured by ZEON Corporation and Pyratex manufactured by NIPPON A&L INC. Examples of a commercially available copolymer having different compositional monomer mixing ratios within the same particle include V0658 manufactured by JSR Corporation. All of these can be used as the (A-1) synthetic rubber latex with unsaturated diene of the adhesive composition of the present invention.

In the vinylpyridine-styrene-butadiene copolymer rubber latex, the monomer ratio of vinylpyridine:styrene:butadiene is not particularly limited, and it is preferable that a copolymer constituting a vinylpyridine-styrene-butadiene copolymer particle include a copolymer made by polymerizing a monomer mixture composed of from 5 to 20% by mass of vinylpyridine, from 10 to 40% by mass of styrene, and from 45 to 75% by mass of butadiene. This is because when vinylpyridine is 5% by mass or more, the pyridine moiety that has a vulcanization-promoting effect in the rubber component is in an appropriate amount, the degree of cross-linking by sulfur increases, and the adhesive strength of an adhesive layer as a whole is further improved, and when vinylpyridine is 20% by mass or less, the degree of cross-linking of a rubber does not become over-vulcanized, and a hard adhesive can be obtained. And because when the amount of styrene is 10% by mass or more, latex particles and an adhesive layer will have sufficient strength and adhesive strength will be improved, and when the amount is 40% by mass or less, the adhesive layer and an adhered rubber will have moderate co-vulcanization and adhesive strength will still be secured. And further because when butadiene is 45% by mass or more, more adequate cross-linking can be formed, and when butadiene is 75% by mass or less, the cross-linking is moderate and favorable durability due to changes in volume and modulus can be ensured. The composition ratio of a vinylpyridine:styrene:butadiene monomer mixture can suitably be, for example, 15:15:70.

In the present invention, as the (A) rubber latex with unsaturated diene, the (A-1) synthetic rubber latex with unsaturated diene, as well as (A-2) a natural rubber latex can be used. For example, a field latex, an ammonia-treated latex, a centrifugally concentrated latex, a deproteinized latex treated with a surfactant or enzyme, or a combination of these can be used as the natural rubber latex. Of these, field latex is preferable.

The content (solid content ratio) of the (A-2) natural rubber latex in the total solid content of the adhesive composition of the present invention is not particularly limited, and is preferably 25% by mass or more, more preferably 40% by mass or more, and still more preferably 50% by mass or more. The content of the (A-2) natural rubber latex is preferably 95% by mass or less, more preferably 90% by mass or less, and still more preferably 85% by mass or less.

<(B) Polylysine>

The production method of the polylysine is not limited, but examples of polylysine include α-polylysine, a linearly polymerized polyamino acid of an essential amino acid, L-lysine, produced by chemical synthesis, and ε-polylysine, produced by a fermentation method.

Among ε-polylysine obtained by microbial fermentation, ε-polylysine obtained by culturing polylysine-producing bacteria represented by *Streptomyces albulus* or *Streptomyces noursei* in a culture medium and separating the bacteria from the culture medium after cultivation has a degree of polymerization of from 25 to 35, and can be preferably used in the present invention. The ε-polylysine obtained by microbial fermentation can be heat-treated at a temperature of 150° C. or higher in an inert gas atmosphere or vacuum (see JP 2003-171463 A) to obtain polylysine with a molecular weight of 30,000 or higher by SDS-PAGE measurement method.

ε-poly-L-lysine is a water-soluble polyamino acid in which the amino group at the ε-position of L-lysine is peptide bonded to a carboxyl group and linked in a linear manner, and is an excellent cationic polymer with biodegradability, which is produced by bacterial fermentation or the like and is used as a natural preservative for food. Examples of polylysine include a compound represented by structural formula (2):

(2)

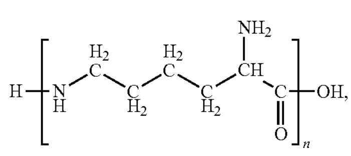

where n represents the degree of polymerization of the lysine.

The degree of polymerization n of the polylysine is not particularly limited as long as the ε-polylysine is soluble in water, and is, for example, an integer from 3 to 300, and is preferably 10 or more, and more preferably 15 or more. In the present invention, ε-polylysine with a degree of polymerization n in the range of from 25 to 35 is mainly used. The weight average molecular weight of the polylysine is preferably 500 or more, more preferably 2,000 or more, and preferably 40,000 or less, more preferably 20,000 or less, more preferably 10,000 or less, and particularly preferably 7,000 or less.

Polylysine is usually a homopolymer of lysine, but may contain another amino acid as a monomer.

In the adhesive composition of the present invention, the (B) polylysine has an effect of suppressing the tackiness of rubber latex and improving workability. An example of the principle of an action exhibited by the (B) polylysine contained in the adhesive composition of the present invention will be described with reference to FIGS. 2 and 3.

Conventionally, in an adhesive composition containing resorcin and formaldehyde, these resorcin and formaldehyde form a resol-type resorcin-formaldehyde condensate between rubber latex particles dispersed in a water solvent, and on the surface of the rubber latex in the adhesive composition, a methylol group of a resol-type resorcin-formaldehyde condensate is added and co-condensed with rosinate or the like used as an emulsifier to form coating of a phenolic resin by chemical cross-linking, thereby suppressing the tackiness of the rubber latex.

On the other hand, in the adhesive composition of the present invention, polylysines 12 form a network in water below the gelation temperature and coat the surface of a synthetic rubber latex 11 (core) with unsaturated diene. The synthetic rubber latex 11 with unsaturated diene has a negative (−) charge on the surface thereof due to a carboxylic acid of an emulsified rosinate or the like, to which a cationic group of an amino group (—$NH_2$) of a polylysine 12 molecule is adsorbed by electrostatic attraction to form a complex, and this coating suppresses the tackiness of the synthetic rubber latex 11 with unsaturated diene (latex-polylysine protective film effect 20).

As a result, the adhesive composition of the present invention containing the (B) polylysine suppresses the tackiness of a rubber latex, which is measured as the mechanical stability of an adhesive liquid under shear strain, thereby enabling an organic fiber cord to be coated with the adhesive composition and preventing adhesion of the adhesive composition to a roll or the like in the drying and thermosetting process, thereby providing favorable workability.

Furthermore, the polylysine 12 of the adhesive composition 2 of the present invention coated on the surface of the organic fiber cord 1 is chemically cross-linked by an amide or ester bond with a carboxylic acid portion of highly reactive rosin acid or the like by heat treatment, resulting in favorable adhesion property of the organic fiber and a coating rubber composition.

In addition, as described below, when the adhesive composition of the present invention contains (C) a aqueous compound containing a (thermally dissociable blocked) isocyanate group, in the polylysine 12, an amino group (—$NH_2$), a hydroxyl group (—OH), or the like possessed by the polylysine 12 forms a protein-isocyanate cross-link 22 with an activated isocyanate group 14 possessed by a urethane resin 13 formed by an aqueous compound with a (thermally dissociable blocked) isocyanate group by heat treatment at high temperature after drying. As a result, an adhesive composition containing the (B) polylysine and the (C) aqueous compound with a (thermally dissociable blocked) isocyanate group has more favorable adhesion property between an organic fiber and a coating rubber composition.

The polylysine used in the present invention is available in powder or aqueous solution form, and for use in the adhesive composition of the present invention, the polylysine is preferably used as an aqueous solution.

Polylysine is one of the food additives used as a food preservative and is considered to be a safe substance, while polylysine is a natural preservative with bactericidal properties. Especially when an adhesive composition solution is an aqueous solution with a pH close to neutral, the inclusion of polylysine can prevent bacterial spoilage and the odor thereof.

The content of the (B) polylysine (solid content ratio) in the total solid content of the adhesive composition is not particularly limited, and is preferably 0.05% by mass or more, and preferably 20% by mass or less. The content of the (B) polylysine is more preferably from 0.2% by mass to 15% by mass, and further preferably from 0.5% by mass to 12% by mass. When the content of the (B) polylysine is 0.05% by mass or more, a bactericidal effect is obtained. When the content of the (B) polylysine is 0.2% by mass or more, adhesion of the adhesive composition to a roll or the like can be further suppressed, which has an advantage of more favorable workability. Furthermore, when the content of the (B) polylysine is 20% by mass or less, the amount of polylysine contained in an adhesive layer does not become too large, and the fracture resistance of the adhesive layer can be sufficiently secured.

<(C), (D) and (E)>

The adhesive composition of the present invention preferably further contains one or more compounds selected from the group consisting of (C) an aqueous compound with a (thermally dissociable blocked) isocyanate group, (D) an epoxide compound, and (E) a polyphenol.

In the adhesive composition of the present invention, the (C) aqueous compound with a (thermally dissociable blocked) isocyanate group and the (D) epoxide compound function as cross-linking agents and contribute, for example, to improving the adhesion property between an organic fiber and a coating rubber composition.

On the other hand, the (E) polyphenol has a function of improving the affinity between an adhesive composition and an organic fiber surface, which in turn improves the adhesion property between an organic fiber and a coating rubber composition.

Accordingly, the (C) aqueous compound with a (thermally dissociable blocked) isocyanate group, the (D) epoxide compound, and the (E) polyphenol all contribute to improved adhesion property, such as adhesion between an organic fiber and a coating rubber composition.

<(C) Aqueous Compound with (Thermally Dissociable Blocked) Isocyanate Group>

The (thermally dissociable blocked) isocyanate group of the (C) aqueous compound with a (thermally dissociable blocked) isocyanate group means a thermally dissociable blocked isocyanate group or isocyanate group. Specifically, the (thermally dissociable blocked) isocyanate groups include: (a) a thermally dissociable blocked isocyanate group resulting from reaction of an isocyanate group with a thermally dissociable blocking agent for the isocyanate group; (b) an isocyanate group in which the isocyanate group is unreacted with a thermally dissociable blocking agent for the isocyanate group; (c) an isocyanate group resulting from dissociation of a thermally dissociable blocking agent from a thermally dissociable blocked isocyanate group; and (d) an isocyanate group.

The aqueous nature of the (C) aqueous compound with a (thermally dissociable blocked) isocyanate group means water-soluble or water-dispersible. The water solubility does not necessarily mean complete water solubility, but also means partial water solubility or no phase separation in aqueous solution of an adhesive composition.

The (C) aqueous compound with a (thermally dissociable blocked) isocyanate group is preferably (C-1) a water-dispersible (thermally dissociable blocked) isocyanate compound composed of an addition product of a polyisocyanate with an aromatic ring and a blocking agent with one or more active hydrogen groups, (hereinafter, also simply referred to as "(C-1) component"). In this case, when an adhesive composition is used for the organic fiber, the adhesion property between the organic fiber and the coating rubber composition is more favorable.

Here, with respect to the (C-1) component, the active hydrogen group means a group containing hydrogen that becomes active hydrogen, i.e., atomic hydrogen (hydrogen radical) and hydride ion (hydride), when placed under suitable conditions. Examples of the active hydrogen group include an amino group and a hydroxyl group.

The thermally dissociable blocking agent is not particularly limited as long as the blocking agent compound protects the isocyanate group from any chemical reaction, while allowing the isocyanate group to be restored by dissociating the blocking agent through heat treatment, if necessary. Specifically, the thermal dissociation temperature is preferably such that the cross-linking reactivity of an isocyanate group whose reactivity has been suppressed by being sealed by a thermally dissociable blocking agent can be restored at the temperature of heat treatment for thermosetting after adhesion and drying of an adhesive treatment liquid in the process indicated in FIG. 1.

Examples of the blocking agent include, but are not particularly limited to, alcohol, phenol, active methylene, oxime, lactam, and amine, and specific examples thereof include: a lactam such as ε-caprolactam, δ-valerolactam, or γ-butyrolactam; a phenol such as phenol, cresol, ethylphenol, butylphenol, octylphenol, nonylphenol, dinonylphenol, thiophenol, chlorophenol, or amylphenol; an oxime such as methyl ethyl ketoxime, acetoxime, acetophenone oxime, benzophenone oxime, or cyclohexanone oxime; an alcohol such as methanol, ethanol, butanol, isopropyl alcohol, butyl alcohol, or cyclohexanol; a malonic acid dialkyl ester such as dimethylmalonate or diethylmalonate; an active methylene such as methyl acetoacetate, ethyl acetoacetate, or acetylacetone, a mercaptan such as butyl mercaptan or dodecyl mercaptan; an amide such as acetanilide or amide acetate; an imide such as succinic imide, phthalic imide, or maleic imide; a sulfite such as sodium bisulfite; cellosolve such as methyl cellosolve, ethyl cellosolve, or butyl cellosolve; a pyrazole such as pyrazole, 3,5-dimethylpyrazol e, 3-methylpyrazole, 4-benzyl-3,5-dimethylpyrazole, 4-nitro-3, 5-dimethylpyrazole, 4-bromo-3,5-dimethylpyrazole, or 3-methyl-5-phenylpyrazole; an amine such as dimethylamine, diethylamine, di-n-propylamine, diisopropylamine, dicyclohexylamine, diphenylamine, xylidine, N,N-diethylhydroxyamine, N,N'-diphenylformamidine, 2-hydroxypyridine, 3-hydroxypyridine, and 2-mercaptopyridine: and a triazole such as 1,2,4-triazole. A mixture of two or more kinds of these or the like may also be used.

Among these blocking agents, phenol, ε-caprolactam and ketoxime, which are easy to obtain stable thermosetting of an adhesive composition by thermal dissociation on heating, are suitably used.

The (C-1) component specifically includes aromatic polyisocyanates or aromatic aliphatic polyisocyanates. Examples of aromatic isocyanates include: a phenylene diisocyanate such as m-phenylene diisocyanate or p-phenylene diisocyanate; a tolylene diisocyanate such as 2,4-tolylene diisocyanate, or 2,6-tolylene diisocyanate (TDI); a diphenylmethane diisocyanate such as 2,4'-diphenylmethane diisocyanate, 4,4'-diphenylmethane diisocyanate (MDI), dialkyl diphenylmethane diisocyanate, or tetraalkyl diphenylmethane diisocyanate; a polymethylene polyphenyl polyisocyanate (polymeric MDI); a m- or p-isocyanatophenylsulfonyl isocyanate; a diisocyanatobiphenyl such as 4,4'-diisocyanatobiphenyl or 3,3'-dimethyl-4,4'-diisocyanatobiphenyl; and a naphthalene diisocyanate such as 1,5-naphthylene diisocyanate. Examples of the aromatic aliphatic polyisocyanate include: a xylylene diisocyanate such as m-xylylene diisocyanate, p-xylylene diisocyanate (XDI), or tetramethylxylylene diisocyanate; diethylbenzene diisocyanate; and α,α,α,α-tetramethylxylylene diisocyanate (TMXDI). Other examples include a modification of the polyisocyanate with carbodiimide, polyol, or allophanate.

Among these polyisocyanates containing an aromatic ring in the molecule, from the viewpoint of cord-bundling property of an adhesive composition, such a polyisocyanate is preferably an aromatic isocyanate, more preferably tolylene diisocyanate (TDI), diphenylmethane diisocyanate (MDI), or polymethylene polyphenyl polyisocyanate (polymeric MDI), and particularly preferably a diphenylmethane diisocyanate (MDI). By using a blocked methylene diphenyl isocyanate, in particular a blocked methylene diphenyl diisocyanate (diphenylmethane diisocyanate), as the (C-1) component, when an adhesive composition is used for an organic fiber, the adhesion property between the organic fiber and a coating rubber composition is more favorable.

It is more preferable that the (C) aqueous compound with a (thermally dissociable blocked) isocyanate group is (C-2) an aqueous urethane compound with a (thermally dissociable blocked) isocyanate group (hereinafter, also simply referred to as "(C-2) component"). Also in this case, when an adhesive composition is used for an organic fiber, the adhesion property between an organic fiber and a coating rubber composition is more favorable. Details of the (C-2) component are described below for convenience of explanation.

The content (solid content ratio) of the (C) aqueous compound with a (thermally dissociable blocked) isocyanate group in the total solid content of the adhesive composition of the present invention is not particularly limited, and is preferably 5% by mass or more, more preferably 10% by mass or more, and further preferably 20% by mass or more. The content of the (C) aqueous compound with a (thermally dissociable blocked) isocyanate group is preferably 75% by mass or less, more preferably 60% by mass or less, and further preferably 45% by mass or less. This is because when the content of the (C) aqueous compound with a (thermally dissociable blocked) isocyanate group is 5% by mass or more, the adhesion property between an organic fiber and a coating rubber composition is more favorable. And because when the content of the (C) aqueous compound with a (thermally dissociable blocked) isocyanate group is 75% by mass or less, a certain relative amount of another component such as rubber latex can be maintained in the adhesive composition, and as a result, the adhesion property with an adhered rubber is more favorable.

Here, in a conventional adhesive composition containing resorcin and formaldehyde, a sea-island structure is formed where rubber latex particles (analogous to islands) are dispersed in a phenolic resin (analogous to sea) in which these resorcin and formaldehyde are co-condensed, and this provides favorable adhesion property between a phenolic resin coating the surface of an organic fiber and the organic fiber.

On the other hand, in one suitable embodiment of the adhesive composition of the present invention, the (C) aqueous compound with a (thermally dissociable blocked) isocyanate group in place of the phenolic resin in which resorcin and formaldehyde are copolymerized, acts as an adhesion promoter with two functional effects (a) and (b) below. As a result, in the adhesive composition, the (C) aqueous compound with a (thermally dissociable blocked) isocyanate group contributes to the characteristic of favorable adhesion property of an organic fiber and a coating rubber composition.

(a) A functional effect of promoting adhesion between an organic fiber and an adhesive layer by distributing the aqueous compound at a position near the interface between the organic fiber and the adhesive layer made of an adhesive composition.

(b) A functional effect of reinforcing the adhesive layer by forming a three-dimensional network structure in the adhesive layer of the adhesive composition by cross-linking with isocyanate groups by the compound with a (thermally dissociable blocked) isocyanate group.

An example of the principle of the two functional effects (a) and (b) of the (C) aqueous compound with a (thermally dissociable blocked) isocyanate group as an adhesion promoter in one embodiment of the adhesive composition of the present invention is described in detail below.

Specifically, a case in which the (C) aqueous compound with a (thermally dissociable blocked) isocyanate group is the (C-1) component is described with reference also to FIG. 2, and a case in which the (C) aqueous compound with a (thermally dissociable blocked) isocyanate group is the (C-2) component is also described with reference also to FIG. 3.

<<Functional Effect of (a) as Adhesion Promoter>>

A synthetic resin material of polyester such as polyethylene terephthalate, which is generally used as an organic fiber, is composed of a flat linear polymer chain. The surface of the polymer chain or a gap between the polymer chains contains a π-electronic atmosphere derived from an aromatic ring or the like contained in the polymer chain. Furthermore, polyester contains particularly few hydroxyl groups on the surface thereof, compared to 6,6-nylon. Therefore, an adhesive composition used for an organic fiber made of polyester has conventionally contained, as an adhesion promoter, a molecule with a planar structure (a portion easily diffused into the organic fiber) with an aromatic ring with an aromatic π-electron on a side in order to obtain sufficient adhesive strength, for the purpose of: dispersion of the adhesive composition into a gap between the polymer chains of the organic fiber; and adhesion of an adhesive layer by the adhesive composition to the surface of the polymer chains of the organic fiber.

As a specific example of such an adhesion promoter, the (C-1) component has conventionally been used.

The (C-1) component is preferably a (blocked) isocyanate such as methylene diphenyl diisocyanate with a particle size of from 0.01 to 0.50 μm (see Patent Document 3).

Figure 2:
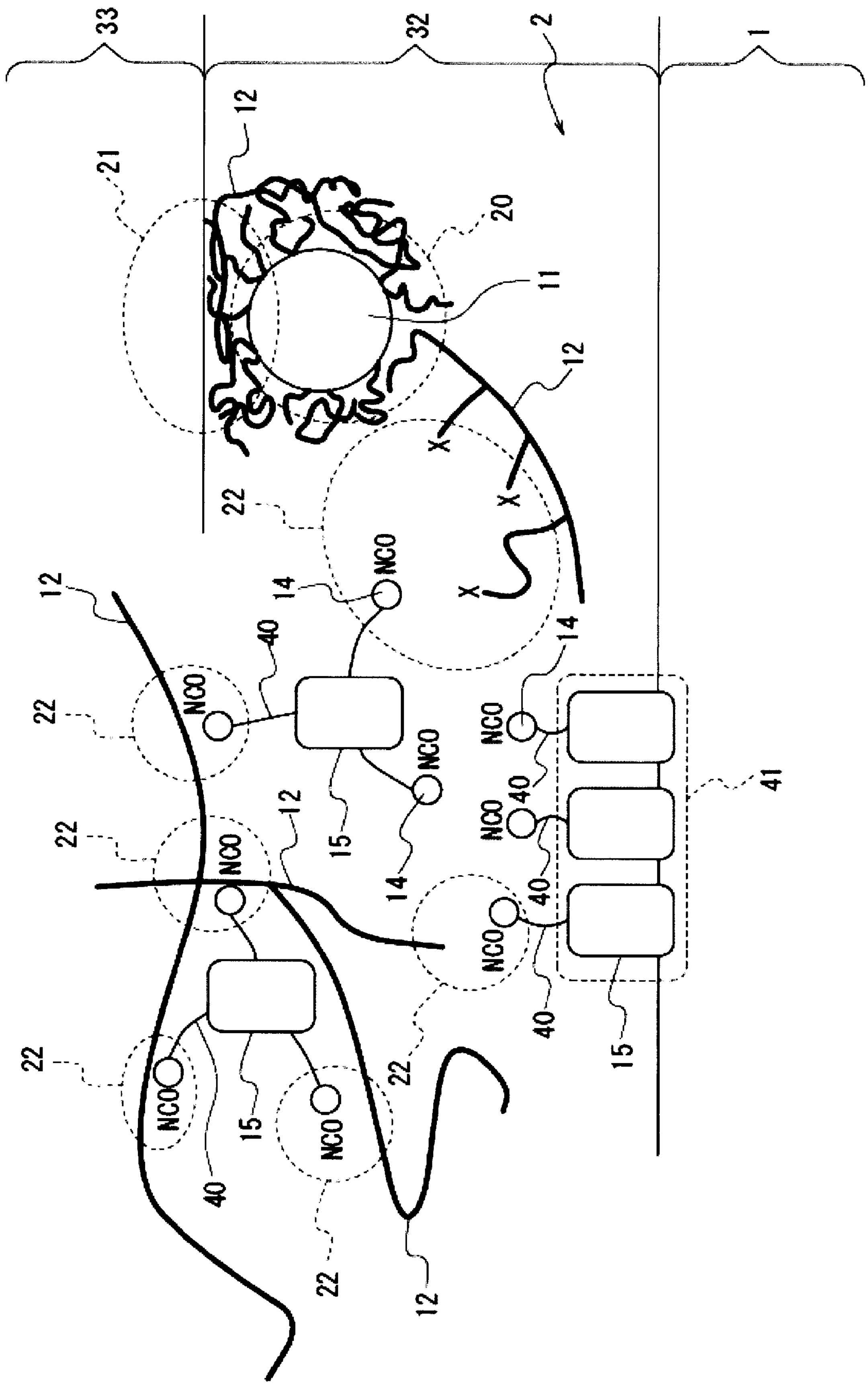
FIG. 2 is a schematic diagram illustrating the principle of adhesion property improvement by an adhesive composition according to an embodiment of the present invention when (C-1) a water-dispersible (thermally dissociable blocked) isocyanate compound composed of an addition product of a polyisocyanate containing an aromatic ring and a blocking agent containing one or more active hydrogen groups is used.

The adhesive layer containing the (C-1) component is illustrated in FIG. 2. In an adhesive layer 32 consisting of an adhesive composition 2, (C-1) a component 40 diffuses into an organic fiber cord 1 (aromatic isocyanate-organic fiber diffusion effect 41) and forms polylysine isocyanate cross-links 22 by covalent bonding with polylysine 12 in the adhesive layer, whereby the adhesive composition 2 disperses into a gap between polymer chains of the organic fiber cord 1, and the adhesive layer 32 consisting of the adhesive composition 2 adheres to the surface of the polymer chains of the organic fiber cord 1.

The particle size of the (C-1) component is preferably from 0.01 to 0.50 μm, as described above. When the particle size of the (C-1) component is less than 0.01 μm, the (C-1) component tends to diffuse in an adhesive layer over time from the surface of a polymer chain of an organic fiber to a gap between the polymer chains of the organic fiber where aromatic π electrons are more abundant, and this reduces an effect as an adhesion promoter. Therefore, the particle size of the (C-1) component needs to be large to some extent in order to remain on the surface of an organic fiber. When the particle size of the (C-1) component is 0.50 μtm or less, the smaller the particle size of the (C-1) component is the more difficult it is for the (C-1) component to settle in a liquid, and the less likely it is to be dispersed unevenly in an adhesive layer.

It is further preferable that the adhesive composition contains the (C-2) aqueous urethane compound with a (thermally dissociable blocked) isocyanate group, which contains in the molecular structure a hydrophobic aromatic polyisocyanate moiety, which is a portion that easily diffuses into an organic fiber, as well as a hydrophilic molecular chain moiety, which is a portion that does not diffuse into an organic fiber.

Figure 3:
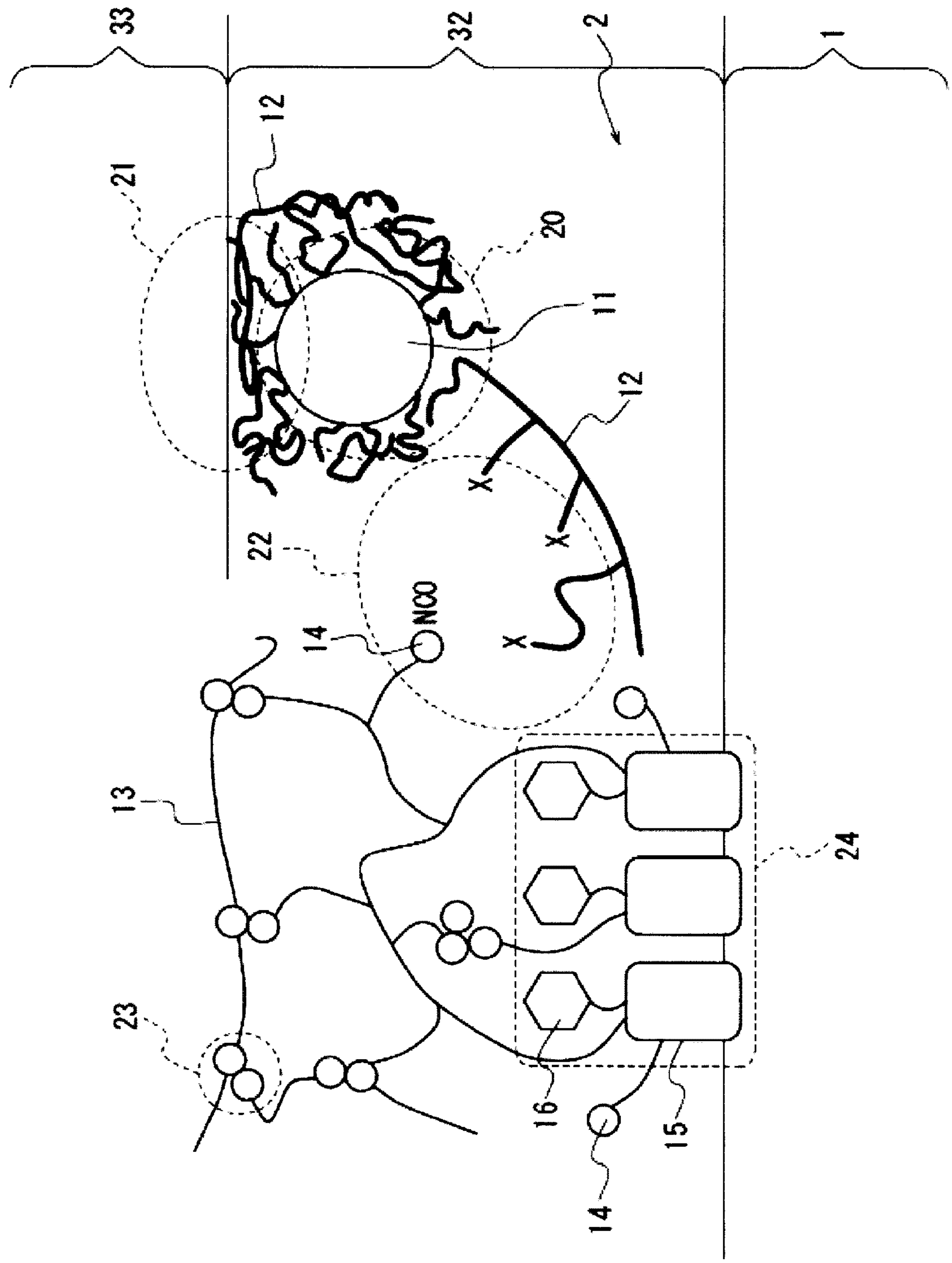
FIG. 3 is a schematic diagram illustrating the principle of adhesion property improvement by an adhesive composition according to one embodiment of the present invention when a (C-2) aqueous urethane compound with a (thermally dissociable blocked) isocyanate group is used.

As illustrated in FIG. 3, the urethane resin 13 formed by the (C-2) component in the adhesive layer 32 by the adhesive composition 2 contains both a portion 15 that is easy to interact with the organic fiber cord 1 and a portion 16 that is difficult to diffuse into the organic fiber cord 1.

The presence of the portion 15, which is easy to interact with an organic fiber cord, causes the adhesive layer 32 consisting of the adhesive composition 2 to adhere to the surface of a polymer chain of the organic fiber cord 1. The presence of the portion 16, which is difficult to diffuse into the organic fiber cord 1, causes the urethane resin 13 formed by the (C-2) component to maintain a functional effect of promoting adhesion property at the interface with the adhesive layer 32 (water-based urethane-organic fiber interface effect 24).

As a result, an adhesive composition containing the (C-2) component provides a favorable adhesion property between an organic fiber and a coating rubber composition.

When the (C) aqueous compound with a (thermally dissociable blocked) isocyanate group is an aromatic polyisocyanate compound with an anionic or nonionic water-soluble functional group, the compound tends to disperse in water from the surface of the hydrophobic organic fiber cord 1 and therefore is preferably the (C-2) component.

<<Functional Effect of (b) as Adhesion Promoter>>

In an adhesive layer containing the (C-1) component, as illustrated in FIG. 2, an activated isocyanate group, thermally dissociated from the (C-1) component 40 blocking agent, forms the polylysine isocyanate cross-link 22 with an adjacent molecular chain of the polylysine 12, resulting in an adhesive layer containing a three-dimensional network structure. As a result, an adhesive composition containing the (C-1) component has a favorable adhesion property between an organic fiber and a coating rubber composition.

Since a material made by forcibly emulsifying and dispersing an aromatic-based powder is used, a dipping bath (dipping tank) 3 of FIG. 1 is preferably stirred to prevent the compound from settling in a liquid and resulting in non-uniform dispersion and aggregation in an adhesive layer.

The adhesive composition of the present invention more preferably contains the (C-2) component as an adhesion promoter. Since the (C-2) component contains an alkylene oxide moiety or the like in the molecule, the component can be dispersed uniformly in water by self-emulsification or the like due to swelling of water.

Furthermore, because the (C-2) component uniformly dispersed in water contains a hydrophobic organic isocyanate moiety in the molecule, for example, similar to a water-soluble urethane used for an aggregation type thickener, a stable aggregation micelle is formed between hydrophobic portions of adjacent aqueous urethanes to have a three-dimensional network structure due to hydrophobic interaction between uniformly dispersed aqueous urethanes in a liquid.

Next, an adhesive composition having the three-dimensional network structure by hydrophobic bonding is coated on an organic fiber, then dried and thermoset. Then, as illustrated in FIG. 3, the activated isocyanate groups 14, thermally dissociated from the blocking agent, forms an activated isocyanate cross-link 23 by covalent bonding between adjacent groups, resulting in an adhesive layer containing a three-dimensional network structure of the urethane resin 13 formed by the (C-2) component. As a result, an adhesive composition containing the (C-2) component provides a favorable adhesion property between an organic fiber and a coating rubber composition.

<<Thermally Dissociable Blocking Agent, Aqueous Urethane Compound>>

A thermally dissociable blocking agent of the (C-2) component is not particularly limited as long as a blocking agent compound is such that an isocyanate group can be restored by dissociating the blocking agent by heat treatment, if necessary, while protecting the isocyanate group from any chemical reaction. As a specific example of the thermally dissociable blocking agent, the same compound as the blocking agent for the (C-1) component can be used, and preferable examples thereof include: a phenol such as phenol, thiophenol, chlorophenol, cresol, resorcinol, p-sec-butylphenol, p-tert-butylphenol, p-sec-amylphenol, p-octylphenol, or p-nonylphenol; a secondary or tertiary alcohol such as isopropyl alcohol, tert-butyl alcohol; an aromatic secondary amine such as diphenylamine or xylidine; a phthalic imide; a lactam such as δ-valerolactam; a caprolactam such as ε-caprolactam; a malonic acid dialkyl ester such as diethylmalonate or dimethylmalonate, an active methylene compound such as acetylacetone or acetoacetate alkyl ester; an oxime such as acetoxime, methyl ethyl ketoxime, or cyclohexanone oxime; a basic nitrogen compound such as 3-hydroxypyridine, 1,2-pyrazole, 3,5-dimethylpyrazole, 1,2,4-triazole, diisopropylamine, or N,N'-diphenylformamidine, and an acidic sodium sulfite.

Among these blocking agents, phenol, ε-caprolactam and ketoxime, which are easy to obtain stable thermosetting of an adhesive composition by thermal dissociation on heating, are suitably used.

The aqueous nature of the aqueous urethane compound means water-soluble or water-dispersible. The water-solubility does not necessarily mean complete water-solubility, but also means partial water-solubility or no phase separation in aqueous solution of an adhesive composition.

The urethane compound of the aqueous urethane compound is a compound with a covalent bond formed between a nitrogen of an amine and a carbon of a carbonyl group, meaning a compound represented by general formula (3):

(3)

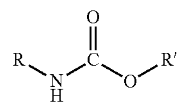

where R and R' represent hydrocarbon groups.

The molecular weight of the (C-2) aqueous urethane compound with a (thermally dissociable blocked) isocyanate group is not particularly limited as long as the compound can maintain an aqueous property, and the number-average molecular weight is preferably from 1,500 to 100,000, and especially preferably 9,000 or less.

The method of synthesizing the (C-2) component is not particularly limited, as described above, and can be any known method, such as the method described in JP S63-51474 A.

<<Preferable Embodiment of (C-2) Aqueous Urethane Compound with (Thermally Dissociable Blocked) Isocyanate Group>>

A preferable embodiment of the (C-2) component is a reaction product after mixing and reacting (α) an organic polyisocyanate compound containing from 3 to 5 functional groups and having a number-average molecular weight of 2,000 or less, (β) a compound containing from 2 to 4 active hydrogen groups and having a number-average molecular weight of 5,000 or less, (γ) a thermally dissociable blocking agent, and (δ) a compound containing at least one active hydrogen group, and at least one hydrophilic group that is anionic, cationic, or nonionic, to a predetermined mixing ratio, and characterized in that the composition ratio of a (thermally dissociable blocked) isocyanate group in the reaction product, where the molecular weight of the isocyanate group (—NCO) is 42, is from 0.5% by mass to 11% by mass. In this case, when an adhesive composition is used for an organic fiber, the adhesion property between the organic fiber and a coating rubber composition is more favorable. This is because such a (C-2) component contains both a moiety composed of a (thermally dissociable blocked) isocyanate group and a hydrophilic moiety containing a hydrophilic group, which has an advantage of increasing the self-water solubility of a urethane compound.

Each mixing ratio of (α), (β), (γ), and (δ) to the total amount of (α), (β), (γ), and (δ) is from 40% by mass to 85% by mass for (α), from 5% by mass to 35% by mass for (β), from 5% by mass to 35% by mass for (γ), and from 5% by mass to 35% by mass for (δ).

The (α) organic polyisocyanate compounds containing from 3 to 5 functional groups and having a number-average molecular weight of 2,000 or less is not particularly limited, and is preferably an aromatic polyisocyanate compound and an oligomer thereof, and may also be another aliphatic, alicyclic, or heterocyclic polyisocyanate compound and an oligomer thereof. This is because the (C-2) component, which is a reaction product after a reaction of such an (α) organic polyisocyanate compound containing from 3 to 5 functional groups and having a number-average molecular weight of 2,000 or less, is more easily dispersed in a gap between polymer chains of an organic fiber.

Specific examples of an aliphatic polyisocyanate compound include ethylene diisocyanate, 1,4-tetramethylene diisocyanate, 1,6-hexamethylene diisocyanate, 1,12-dodecane-diisocyanate, 2,2,4-trimethylhexamethylene diisocyanate, 2,4,4-trimethylhexamethylene diisocyanate, dimer diisocyanate, and lysine diisocyanate, specific examples of an alicyclic polyisocyanate compound include cyclobutane-1,3-diisocyanate, cyclohexane-1,3-diisocyanate, cyclohexane-1,4-diisocyanate, isophorone diisocyanate, 4,4'-methylenebis (cyclohexylisocyanate), methylcyclohexane-2,4-diisocyanate, methylcyclohexane-2,6-diisocyanate, and 1,3-(isocyanatomethyl)cyclohexane, specific examples of a heterocyclic polyisocyanate compound include a tolylene diisocyanate adduct of 1,3,5-tris(2'-hydroxyethyl)isocyanuric acid, and specific examples of an aromatic polyisocyanate compound include m-phenylenediisocyanate, p-phenylenediisocyanate, 2,4-tolylenediisocyanate, 2,6-tolylenediisocyanate, m-xylylenediisocyanate, p-xylylenediisocyanate, 2,4'-diphenylmethane diisocyanate, 4,4'-diphenylmethane diisocyanate, m-tetramethylxylylene diisocyanate, p-tetramethylxylylene diisocyanate, methine tris(4-phenylisocyanate), tris(4-isocyanatophenyl)methane, tris(4-isocyanatophenyl ester), 3-isopropenyl-α',α'-dimethylbenzylisocyanate and an oligomeric mixture thereof, or a modification of these polyisocyanates with carbodiimide, polyol or allophanate.

Among them, an aromatic polyisocyanate compound is preferable, and particularly preferable examples include methylene diphenylphenylpolyisocyanate and polyphenylene polymethylene polyisocyanate. In particular, polyphenylene polymethylene polyisocyanate with a number-average molecular weight of 2,000 or less is preferable, and polyphenylene polymethylene polyisocyanate with a number-average molecular weight of 1,000 or less is particularly preferable. This is because the (C-2) component, which is a reaction product after a reaction of such an (α) organic polyisocyanate compound containing from 3 to 5 functional groups and having a number-average molecular weight of 2,000 or less, is more easily dispersed in a gap between polymer chains of an organic fiber.

The (β) compound containing from 2 to 4 active hydrogen groups and having a number-average molecular weight of 5,000 or less is not particularly limited. Specific examples thereof include a compound selected from the group consisting of the following (i) to (vii):

(i) a polyhydric alcohol containing from 2 to 4 hydroxyl groups and having a number-average molecular weight of 5,000 or less;

(ii) a polyvalent amine containing from 2 to 4 primary and/or secondary amino groups and having a number-average molecular weight of 5,000 or less;

(iii) an amino alcohol containing from 2 to 4 primary and/or secondary amino groups and a hydroxyl group and having a number-average molecular weight of 5,000 or less;

(iv) a polyester polyol containing from 2 to 4 hydroxyl groups and having a number-average molecular weight of 5,000 or less;

(v) a polybutadiene polyol containing from 2 to 4 hydroxyl groups and having a number-average molecular weight of 5,000 or less, and a copolymer of such a polyol and another vinyl monomer;

(vi) a polychloroprene polyol containing from 2 to 4 hydroxyl groups and having a number-average molecular weight of 5,000 or less, and a copolymer of such a polychloroprene polyol and another vinyl monomer; and (vii) a C2-C4 alkylene oxide copolymer of a polyamine, a polyphenol, and an amino alcohol, a C2-C4 alkylene oxide heavy adduct of a polyhydric alcohol of C3 or higher, a C2-C4 alkylene oxide copolymer, or a C3 to C4 alkylene oxide copolymer, which is a polyether polyol containing from 2 to 4 hydroxyl groups and having a number-average molecular weight of 5,000 or less.

Here, with respect to the (C-2) component, an active hydrogen group means a group containing hydrogen that becomes an active hydrogen, i.e., atomic hydrogen (hydrogen radical) and a hydride ion (hydride), when placed under suitable conditions. Examples of the active hydrogen group include an amino group and a hydroxyl group.

Examples of a compound containing at least one active hydrogen group and at least one anionic hydrophilic group, as in the (δ) compound containing at least one active hydrogen group and at least one hydrophilic group, that is anionic, cationic, or nonionic include, but are not particularly limited to, an aminosulfonic acid such as taurine, N-methyltaurine, N-butyltaurine, or sulfanilic acid and an aminocarboxylic acid such as glycine or alanine.

The method of synthesizing the (C-2) component by mixing and reacting (α), (β), (γ), and (δ) is not particularly limited, and can be any known method such as the method described in JP S63-51474.

<<Another Preferable Embodiment of (C-2) Aqueous Urethane Compound with (Thermally Dissociable Blocked) Isocyanate Group>>

Another preferable embodiment of the (C-2) component is a reaction product after mixing and reacting (α) an organic polyisocyanate compound containing from 3 to 5 functional groups and having a number-average molecular weight of 2,000 or less, (β) a compound containing from 2 to 4 active hydrogen groups and having a number-average molecular weight of 5,000 or less, (γ) a thermally dissociable blocking agent, (δ) a compound containing at least one active hydrogen group, and at least one hydrophilic group that is anionic, cationic, or nonionic, and (ε) a compound other than (α), (β), (γ), and (δ) containing an active hydrogen group, to a predetermined mixing ratio, and characterized in that the composition ratio of a (thermally dissociable blocked) isocyanate group in the reaction product, where the molecular weight of the isocyanate group (—NCO) is 42, is from 0.5% by mass to 11% by mass. This is because such a (C-2) component contains both a moiety composed of a (thermally dissociable blocked) isocyanate group and a hydrophilic moiety containing a hydrophilic group, which has an advantage of increasing the self-water solubility of a urethane compound.

Each mixing ratio of (α), (β), (γ), and (δ) to the total amount of (α), (β), (γ), (δ), and (ϵ) is from 40% by mass to less than 85% by mass for (α), from 5% by mass to 35% by mass for (β), from 5% by mass to 35% by mass for (γ), from 5% by mass to 35% by mass for (δ), and from more than 0% by mass to 45% by mass for (ε).

Here, (α) an organic polyisocyanate compound containing from 3 to 5 functional groups and having a number-average molecular weight of 2,000 or less, (β) a compound containing from 2 to 4 active hydrogen groups and having a number-average molecular weight of 5,000 or less, (γ) a thermally dissociable blocking agent, and (δ) a compound containing at least one active hydrogen group, and at least one hydrophilic group that is anionic, cationic, or nonionic are as described above in <<Preferable Embodiment of (C-2) Aqueous Urethane Compound with (Thermally Dissociable Blocked) Isocyanate Group>>, except for the mixing ratio.

The method of synthesizing the (C-2) component by mixing and reacting (α), (β), (γ), (δ), and (ε) is not particularly limited, and can be any known method such as the method described in JP S63-51474.

<<Still Another Preferable Embodiment of (C-2) Aqueous Urethane Compound with (Thermally Dissociable Blocked) Isocyanate Group>>

Still another preferable embodiment of the (C-2) component is represented by general formula (1):

$$\left[(\mathrm{YCONH})_p - \overset{(\mathrm{NHCOZ})_m}{\overset{|}{\mathrm{A}}} - \mathrm{NHCO}\right]_n - \mathrm{X} \qquad (1)$$

[where

A represents a residue of an organic polyisocyanate compound from which an active hydrogen group has been removed, X represents a residue of a polyol compound containing from 2 to 4 hydroxyl groups and having a number-average molecular weight of 5,000 or less, from which an active hydrogen group has been removed, Y represents a residue of a thermally dissociable blocking agent from which an active hydrogen group has been removed, Z represents a residue of a compound containing at least one active hydrogen group and at least one salt-forming group or a hydrophilic polyether chain, from which an active hydrogen group has been removed, n represents an integer from 2 to 4, and p+m represents an integer from 2 to 4 (m≥0.25)]. Also in this case, when an adhesive composition is used for an organic fiber, the adhesion property between the organic fiber and a coating rubber composition is more favorable. This is because the (C-2) component contains both a moiety composed of a (thermally dissociable blocked) isocyanate group and a hydrophilic moiety containing a hydrophilic group, which has an advantage of increasing the self-water solubility of a urethane compound.

Here, an organic polyisocyanate compound A in general formula (1) is a residue from which an active hydrogen group of the organic polyisocyanate compound has been removed, preferably containing an aromatic ring. This is because the (C-2) component is more easily dispersed in a gap between polymer chains of an organic fiber.

Although not particularly limited, specific examples thereof include methylenediphenyl polyisocyanate and polyphenylene polymethylene polyisocyanate. Polyphenylene polymethylene polyisocyanate with a number-average molecular weight of 6,000 or less is preferable, and polyphenylene polymethylene polyisocyanate with a number-average molecular weight of 4,000 or less is particularly preferable.

A polyol compound containing from 2 to 4 hydroxyl groups and having a number-average molecular weight of 5,000 or less, which is X in general formula (1), a residue from which an active hydrogen group of a polyol compound containing from 2 to 4 hydroxyl groups and having a number-average molecular weight of 5,000 or less has been removed is not particularly limited. Specific examples thereof include a compound selected from the group consisting of the following (i) to (vi):

(i) a polyhydric alcohol containing from 2 to 4 hydroxyl groups and having a number-average molecular weight of 5,000 or less;

(ii) an amino alcohol containing from 2 to 4 primary and/or secondary amino groups and a hydroxyl group and having a number-average molecular weight of 5,000 or less;

(iii) a polyester polyol containing from 2 to 4 hydroxyl groups and having a number-average molecular weight of 5,000 or less;

(iv) a polybutadiene polyol containing from 2 to 4 hydroxyl groups and having a number-average molecular weight of 5,000 or less, and a copolymer of such a polyol and another vinyl monomer;

(v) a polychloroprene polyol containing from 2 to 4 hydroxyl groups and having a number-average molecular weight of 5,000 or less, and a copolymer of such a polyol and another vinyl monomer; and (vi) a C2-C4 alkylene oxide copolymer of a polyamine, a polyphenol, and an amino alcohol, a C2-C4 alkylene oxide heavy adduct of a polyhydric alcohol of C3 or higher, a C2-C4 alkylene oxide copolymer, or a C3 to C4 alkylene oxide copolymer, which is a polyether polyol containing from 2 to 4 hydroxyl groups and having a number-average molecular weight of 5,000 or less.

The (C-2) component is not particularly limited, and a commercially available product such as ELASTRON BN27, BN77, or BN11 manufactured by DKS Co. Ltd. Among them, ELASTRON BN77 is preferable.

<(D) Epoxide Compound>

One embodiment of the adhesive composition of the present invention contains (A) a rubber latex with unsaturated diene, (B) polylysine, and (D) an epoxide compound.

The (D) epoxide compound means a compound containing an oxacyclopropane (oxirane) (epoxy group), a three-membered ring ether, in the structural formula.

The (D) epoxide compound functions as a cross-linking agent component in the adhesive composition. In other words, when an adhesive composition contains the (D) epoxide compound, cross-linking is introduced between hydroxyl and amine groups in an amino acid unit of the (B) polylysine, resulting in a marked improvement in the fracture resistance of an adhesive layer and in the adhesive strength at high temperature.

The (D) epoxide compound is preferably mixed with the (C) aqueous compound with a (thermally dissociable blocked) isocyanate group and heated. This is because when such a (D) epoxide compound is mixed with the (C) aqueous compound with a (thermally dissociable blocked) isocyanate group and heated, cross-linking by nucleophilic reaction between an epoxy group of the (D) epoxide compound and amine, alcohol, thiol, phenol, carboxylic acid, a (thermally dissociable block-dissociated) isocyanate, or the like which the (C) aqueous compound with a (thermally dissociable blocked) isocyanate group contains, is applied to the adhesive composition mainly composed of a urethane bond, thereby suppressing creep and flow caused by stress in a high temperature region.

Still further, an epoxy group of the (D) epoxide compound is preferably multifunctional. This is because the suppression effect is enhanced, the fracture resistance of an adhesive layer by the adhesive composition is increased, and the adhesive strength at high temperatures is also increased.

The (D) epoxide compound is preferably a compound containing two or more epoxy groups per molecule. A compound containing 4 or more epoxy groups per molecule is particularly preferable. The reason for this is that the multifunctionality of an epoxy group results in more suppression of creep and flow due to stress in a high temperature region in an adhesive composition, resulting in a higher fracture resistance of an adhesive layer and higher adhesive strength at high temperatures.

Specific examples of the (D) epoxide compound include a reaction product of a polyhydric alcohol such as diethylene glycol diglycidyl ether, polyethylene glycol diglycidyl ether, polypropylene glycol diglycidyl ether, neopentyl glycol diglycidyl ether, 1,6-hexanediol diglycidyl ether, glycerol polyglycidyl ether, trimethylolpropane polyglycidyl ether, polyglycerol polyglycidyl ether, pentaerythiol polyglycidyl ether, pentaerythiol polyglycidyl ether, diglycerol polyglycidyl ether, or sorbitol polyglycidyl ether and epichlorohydrin; a novolac epoxy resin such as a phenolic novolac epoxy resin or a cresol novolac epoxy resin; and bisphenol A epoxy resin. A reaction product of a polyhydric alcohol and epichlorohydrin, or a novolac epoxy resin is preferable. In particular, when the (D) epoxide compound is a reaction product of a polyhydric alcohol and epichlorohydrin, the compound can be dissolved in water or dispersed in water by emulsification, and thus is easier to produce, which is preferable. A commercially available chemical can be used for the sorbitol polyglycidyl ether, polyglycerol polyglycidyl ether, and novolac epoxy resin.

The (D) epoxide compound can be dissolved in water or dispersed in water by emulsification. For example, the (D) epoxide compound can be dissolved in water as it is. Alternatively, the epoxide compound can be dissolved in a small amount of solvent as needed, and the dissolved solution can be emulsified in water using a known emulsifier, such as sodium alkylbenzenesulfonate, dioctylsulfosuccinate sodium salt, or nonylphenol ethylene oxide adduct to obtain an emulsion liquid.

The content (solid content ratio) of the (D) epoxide compound in the total solid content of the adhesive composition of the present invention is not particularly limited, and is preferably 0.1% by mass or more, and more preferably 5% by mass or more. The content (solid content ratio) of the (D) epoxide compound is preferably 40% by mass or less, and more preferably 25% by mass or less. This is because when the content is 0.1% by mass or more, the adhesion property between a resin and an adhered rubber composition becomes more favorable. And because when the content is 40% by mass or less, a certain relative amount of another component such as rubber latex to be blended in an adhesive composition can be secured above a certain level, resulting in more favorable adhesion property with an adhered rubber.

<(E) Polyphenol>

One embodiment of the adhesive composition of the present invention contains the (A) rubber latex with unsaturated diene, the (B) polylysine, and the (E) polyphenol.

The (E) polyphenol is preferably a plant-derived compound containing a plurality of phenolic hydroxy groups in the molecule. In this case, the adhesion property between an organic fiber and a coating rubber composition is also more favorable when an adhesive composition is used for an organic fiber. Specific examples of the (E) polyphenol include a lignin, a tannin, tannic acid, a flavonoid, and a derivative thereof. Also in this case, when an adhesive composition is used for an organic fiber, the adhesion property between an organic fiber and a coating rubber composition is more favorable.

Although a study (see, for example, JP H07-53858A) to isolate a polyphenol such as a lignin or a tannin, which is a component in wood or bark, and react the polyphenol with formaldehyde to produce an adhesive has long been conducted, there is little knowledge of producing a water-based adhesive composition that does not contain resorcin.

The (E) polyphenol is preferably a lignin or a derivative thereof. A lignin, along with a polysaccharide such as cellulose, is a major component constituting a plant cell wall of a plant body. A lignin contains, for example, a functional group such as a hydroxyl group, a methoxy group, a carbonyl group, and a carboxyl group, and can interact with a cationic polymer such as polylysine, especially because a phenolic hydroxy group is highly reactive.

A lignin is a polymer having a structure based on phenylpropane, but the molecular structure has not yet been fully elucidated because a lignin is a huge biopolymer with a variety of molecular structures, forming a three-dimensional network structure.

Isolation of a natural lignin without denaturing the chemical structure is considered very difficult because a natural lignin forms a strong composite material in a plant cell wall, together with a polysaccharide such as cellulose. A variety of industrial separation methods have been used to extract a lignin from a material such as wood. Examples of a lignin obtained after separation include a lignin sulfonate, a kraft lignin, a soda lignin, and a steam-exploded lignin. Among these industrially treated lignins, a lignin obtained on a large scale from a pulp effluent of a chemical pulping of a paper pulp manufacturing process, namely a lignosulfonate or a kraft lignin is the well-known material in terms of availability and economy.

Other examples of the lignin include a lignin modified by hydroxymethylation, epoxidation, denitrogenation, acylation, or hydroxylation, a diethanolamine modified lignin, an enzyme modified lignin, a laccase modified lignin, a urea modified lignin, a lignosulfonate, an alcel method lignin, an alkaligranit method lignin, and a polyethylene glycol added lignin The kraft lignin is a lignin derived from a chemical pulping method (high-temperature, high-pressure reaction) called kraft steaming, which is a high-temperature, high-pressure reaction by feeding, for example, wood chips from hardwoods, softwoods, miscellaneous trees, bamboo, kenaf, or bagasse, as raw wood into a steaming kettle together with a steaming liquid made of sodium hydroxide/sodium sulfide. Kraft lignin is obtained by adding acid and/or carbon dioxide to a kraft effluent obtained after kraft steaming to precipitate a dissolved lignin modified product, and then dehydrating and washing the precipitate produced. The precipitate after dehydration and washing can be purified by adding an organic solvent such as alcohol or acetone to dissolve the precipitate, separating insoluble impurities and drying, or denatured to introduce a variety of functional groups as needed. The kraft lignin can be obtained and used as a commercially available product. Among them, the reagent name "Lignin, alkali, kraft" (CAS Number: 8068-05-1) manufactured by Sigma-Aldrich Co. LLC is preferable.

The lignin sulfonate is a lignin sulfonic acid and a salt thereof obtained from a waste liquid or the like eluted from a sulfite pulp in a chemical pulping process by sulfite steaming, in which wood chips are reacted at high temperature and high pressure together with a steaming liquid made from sulfurous acid and/or sulfite, and a calcium lignin sulfonate, sodium lignin sulfonate, potassium lignin sulfonate, or magnesium lignin sulfonate salt is particularly preferred. Among them, a sodium lignin sulfonate or the like is preferable. These lignin sulfonates are commercially available, and for example, the San X series manufactured by NIPPON PAPER INDUSTRIES CO., LTD. can be used as lignin sulfonate or modified lignin sulfonate.

Examples of a high value-added lignin sulfonate include not only a high-purity product but also a partially de-(low) sulfonated lignin sulfonate in which the degree of sulfonation is reduced by a method (for example, see JP2016-135834A or the like) in which a lignin sulfonate is heated in an alkaline aqueous solution using sodium hydroxide or ammonia and in the presence of an oxidizing agent, such as oxygen. As a high-purity lignin sulfonate or a modified lignin sulfonate, the Pearllex series manufactured by NIPPON PAPER INDUSTRIES CO., LTD. and as a partially desulfonated lignin sulfonate, the Vanillex series manufactured by Nippon Paper Industries, Ltd. can be used. Among them, a partially de-(low) sulfonated lignin sulfonate in which the degree of sulfonation is reduced, reagent name "lignin (alkali)" (CAS Number: 8061-51-6, solid powder) manufactured by Tokyo Kasei Kogyo Co. is preferable.

The tannins are a group of polyphenolic compounds that are present in a wide range of plants, for example, woody trees, as well as in fruits, leaves and seeds, for example, grapes, persimmons, berries, cloves, beans, medicinal herbs, tea leaves and cocoa beans. A tannin molecule generally contains a large number of hydroxyl groups, and often carboxyl groups as well, and tends to form a strong complex and a complex with a wide range of polymers.

Examples of the tannins include tannic acid, a proanthocyanidin, a flavonoid, a gallic acid ester, and a catechin, as well as a derivative such as a salt or a modification thereof. The flavonoid, which is ubiquitous in leaves, trunk, and bark of plants and is commonly referred to as tannin, is composed of a hydrolyzed tannin and a condensed tannin. These tannins are identified by a fact that when boiled in dilute hydrochloric acid, a condensed tannin produces an insoluble precipitate, while a tannin belonging to the hydrolysis type hydrolyzes to produce a water-soluble substance.

Both hydrolyzed and condensed tannins are water-soluble and can be extracted from a plant material such as a woody part, a bark, a leaf, a fruit, a capsule, or a gall by a hot water extraction method or the like. Hydrolyzed tannins, for example, can be obtained from a woody part of a chestnut or nut, an oak bark, a tea leaf, or a gall of a gallnut or a nutgall, while condensed tannins can be obtained from a woody part of a quebracho, a mimosa bark, a persimmon or a buckwheat seed, or the like. Among them, reagent name: "Tannic acid" (CAS Number: 1401-55-4-6, solid powder), manufactured by NACALAI TESQUE, INC., which is tannic acid obtained from a gallnut or the like, as a hydrolyzed tannin, and trade name "Mimosa" (solid powder), manufactured by Kawamura Tsusho Co., Ltd., obtained from mimosa bark, as a condensed tannin, are preferable.

The content (solid content ratio) of the (E) polyphenol in the total solid content of the adhesive composition of the present invention is not particularly limited, and is preferably 2% by mass or more, more preferably 5% by mass or more, and further preferably 7% by mass or more. The content of the (E) polyphenol is preferably 75% by mass or less, more preferably 50% by mass or less, and further preferably 35% by mass or less. This is because when the content of the (E) polyphenol is 2% by mass or more, the adhesion property between an organic fiber and a coating rubber composition is more favorable. And because when the content of the (E) polyphenol is 75% or less by mass, a certain relative amount of another component such as rubber latex can be maintained in the adhesive composition, and as a result, the adhesion property with an adhered rubber is more favorable.

<Production Method of Adhesive Composition>

The adhesive composition of the present invention contains the (A) rubber latex with unsaturated diene and the (B) polylysine, and suitably further contains one or more compounds selected from the group consisting of the following (C) aqueous compound with a (thermally dissociable blocked) isocyanate group, the (D) epoxide compound, and the (E) polyphenol. In producing the adhesive composition, these (A) rubber latex with unsaturated diene and (B) polylysine, as well as (C) aqueous compound with a (thermally dissociable blocked) isocyanate group, (D) epoxide compound, and (E) polyphenol, can be mixed in any order.

Note, however, that when the (D) epoxide compound is mixed with water, an epoxy group tends to react with water and gradually lose a function as a cross-linking agent. Therefore, it is preferable to use the adhesive composition as soon as possible after mixing the (D) epoxide compound with water for a coating treatment of an organic fiber. Specifically, after mixing the (D) epoxide compound with water, the adhesive composition is preferably used for a coating treatment of an organic fiber within two days, more preferably within one day.

In the adhesive composition of the present invention, the mixing mass ratio [(A): (B)] (in terms of solids) of the (A) rubber latex with an unsaturated diene and the (B) polylysine is not particularly limited, and is preferably in the range of from 100:0.1 to 100:25, and more preferably in the range of from 100:0.2 to 100:20.

This is because when the mixing mass ratio is 100:0.1 or more (ratio value of 1,000 or less), a film of a (B) polylysine microcapsule can be formed around (A) a rubber latex containing the unsaturated diene as a core, and an adhesive layer with sufficient strength can also be obtained. And because when the mixing mass ratio is 100:25 or less (ratio value of 4 or more), the film of the (B) polylysine microcapsule formed around (A) the rubber latex containing the unsaturated diene as the core does not become too thick, and when a coating rubber composition, which is an adherend of an organic fiber, and an adhesive composition are co-vulcanized and bonded, the coating rubber composition and the (A) rubber latex with unsaturated diene are favorably compatible with each other, and as a result, an initial process of adhesion between the coating rubber composition and the adhesive composition suitably progresses.

In mixing the (A) rubber latex containing an unsaturated diene with the (B) polylysine, a known water-soluble material that can strengthen a film composed of the (B) polylysine can be used in combination in normal coacervating. For example, an electrolyte substance composed of gum arabic, a carrageenan, a CMC, an organic or inorganic salt with a cation such as sodium chloride, potassium chloride, magnesium chloride, or ammonium chloride, or a salt with an anion such as sulfate, phosphate, carbonate, or acetate can be used. Furthermore, a liquid substance that is water soluble and in which a film-forming material dissolves less than water, such an alcohol such as ethanol or propanol, or a water-soluble polymer such as isobutylene-maleic anhydride ring-opening copolymer salt, can also be used.

In the adhesive composition of the present invention, the mixing mass ratio [(A): [(C)+(D)+(E)] (in terms of solid contents) of the (A) rubber latex with unsaturated diene to a compound selected from the group consisting of the (C) aqueous compound with a (thermally dissociable blocked) isocyanate group, the (D) epoxide compound, and the (E) polyphenol is not particularly limited, and is preferably in the range from 100:5 to 100:300, more preferably in the range of from 100:7 to 100:150, and further preferably in the range of from 100:10 to 100:60.

This is because when the mixing mass ratio is 100:5 or more (ratio value of 20 or less), the ratio of the (A) rubber latex with unsaturated diene in an adhesive composition does not become too large, the fracture resistance of an adhesive layer with the adhesive composition can be sufficiently maintained, and degradation of the adhesion property under distortion can be prevented. And because when the mixing mass ratio is 100:300 or less (1/3 or more as a ratio value), the ratio of the (A) rubber latex with unsaturated diene in an adhesive composition does not become too low, and when a coating rubber composition, which is an adherend of an organic fiber, and the adhesive composition are co-vulcanized and bonded, the coating rubber composition and the (A) rubber latex are favorably compatible with each other, and as a result, the adhesion property between the coating rubber composition and the adhesive composition is sufficiently high.

The (A) rubber latex with unsaturated diene, (B) polylysine, (C) aqueous compound with a (thermally dissociable blocked) isocyanate group, (D) epoxide compound, and (E) polyphenol are preferably aqueous. This is because water can be used as a solvent with less pollution to the environment.

[Resin Material]

An adhesive composition configured as described above is coated on the surface of a resin base material, for example, a resin base material composed of a polyester resin, an aromatic polyamide resin, or an acrylic resin, and a suitable heat treatment is applied to produce an adhesive layer composed of an adhesive composition, thereby preparing a resin material to which an adhesive treatment is applied.

The resin material of the present invention is characterized in that the surface of a resin base material is coated with an adhesive layer composed of the adhesive composition. This allows the resin material to have superior durability while ensuring environmental friendliness and workability. Particularly preferably, the resin base material is a polyester resin, an aromatic polyamide resin, or an acrylic resin, and in particular, the resin base material is preferably a polyester resin. The resin base material is preferably a cord obtained by twisting together a plurality of filaments.

Examples of the method of coating the surface of a resin base material with an adhesive composition include a method of dipping a resin base material in an adhesive composition, a method of applying an adhesive composition by a brush or the like, and a method of spraying an adhesive composition, and an appropriate method can be selected as needed. The method of coating the surface of a resin base material with an adhesive composition is not particularly limited, and when coating the surface of a resin base material with an adhesive composition, it is preferable to dissolve an adhesive composition in a variety of solvents to reduce the viscosity, since this facilitates the application. Such a solvent, composed mainly of water, is environmentally preferable.

A resin material coated with an adhesive composition on the surface of a resin base material is dried at a temperature of, for example, 100° C. to 210° C., followed by heat treatment. This heat treatment is preferably performed at a temperature above the glass transition temperature of a polymer of the resin base material, and preferably at a temperature from [melting temperature −70° C.] to [melting temperature −10° C.] of the polymer. The reason for this is that below the glass transition temperature of a polymer, the molecular mobility of the polymer is poor and the adhesion-promoting component of an adhesive composition and the polymer cannot interact sufficiently, and therefore the adhesive composition and a resin base material cannot achieve bonding strength. Such a resin base material may be preprocessed by electron beam, microwave, corona discharge, plasma treatment, or the like.

The resin base material may be in any of the following forms: film, cord, cable, filament, filament chip, cord fabric, or canvas. In particular, for reinforcing a rubber article such as a tire article or a conveyor belt, a cord obtained by twisting together a plurality of filaments is suitably used as the resin base material. As the cord, one containing a top twist and a bottom twist, with a twist coefficient of from 1,300 to 2,500 for the bottom twist and from 900 to 1,800 for the top twist, is preferable.

When the resin base material is a cord, it is preferable that the adhesive layer in the resin material is preferably from 0.5 to 6.0% by mass of the mass of the cord in dry mass. By setting the dry mass of an adhesive layer in this range, an appropriate adhesion property can be ensured.

[Rubber Article]

The adhesive composition of the present invention can be suitably used for reinforcing a variety of rubber articles. The rubber article of the present invention is reinforced by the resin material. This allows a rubber article to have superior durability while ensuring environmental friendliness and workability. Examples of such a rubber article of the present invention include a tire, as well as a conveyor belt, a belt, a hose, and an air spring.

[Organic Fiber-Rubber Composite]

The organic fiber-rubber composite of the present invention is a composite of an organic fiber and rubber, characterized in that the organic fiber is coated with the adhesive composition. This provides a favorable adhesion property without using resorcin, and an organic fiber-rubber composite with favorable environmental friendliness and workability. The adhesive composition of the present invention is particularly superior in the adhesion property between an organic fiber, such as an organic fiber cord, and a coating rubber composition.

The organic fiber-rubber composite of the present invention is described in detail with reference to FIG. 4.

Figure 4:
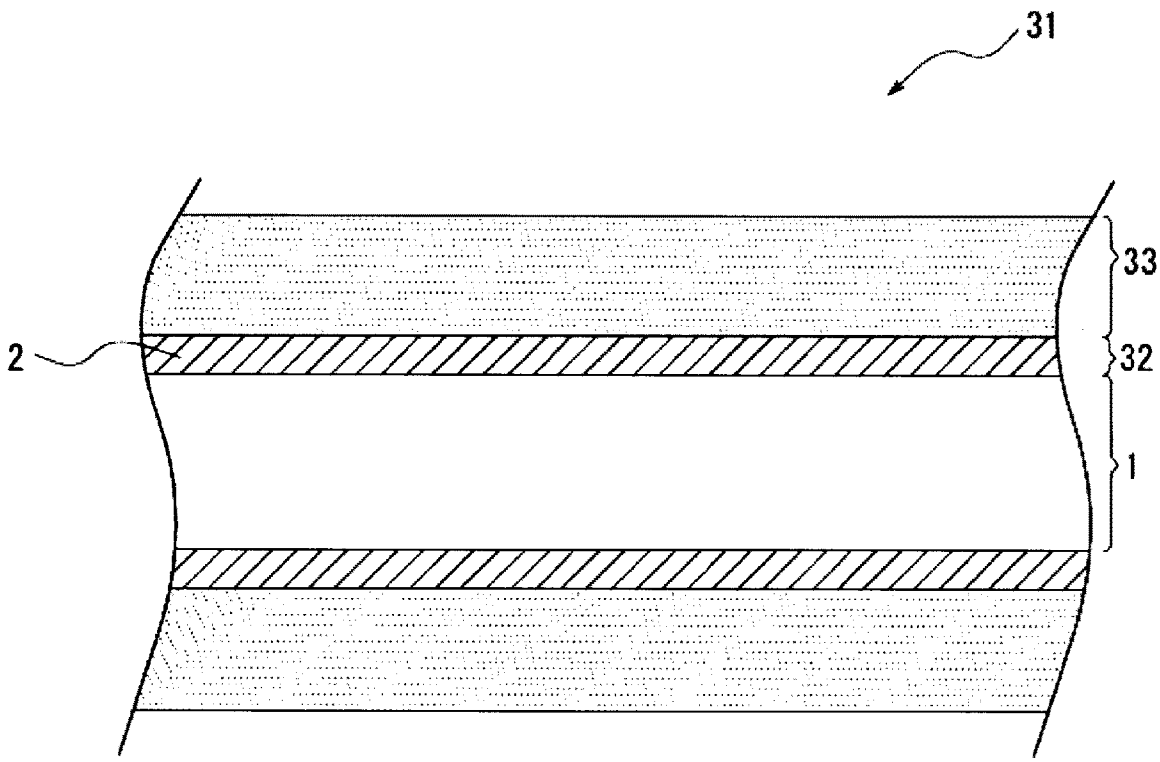
FIG. 4 is a schematic sectional view of an example of the organic fiber-rubber composite of the present invention.

FIG. 4 is a sectional schematic diagram illustrating an organic fiber cord-rubber composite of one example of the organic fiber-rubber composite of the present invention. In an organic fiber-rubber composite 31 illustrated in FIG. 4, the outer surface in the outer diameter direction of the organic fiber cord 1 is coated with the adhesive layer 32 made of the adhesive composition 2 of the present invention. The organic fiber cord 1 is further bonded to the coating rubber composition 33 on the outer side in the outer diameter direction via the adhesive layer 32 consisting of the adhesive composition 2 to form the organic fiber-rubber composite 31 of the present invention.

The form of a reinforcing member of a rubber article using the adhesive composition of the present invention can be the organic fiber-rubber composite, as well as a film, a short fiber, or a non-woven fabric.

<Organic Fiber Cord>

An example of the organic fiber is an organic fiber cord, which is used to supplement the strength of a rubber article such as a tire. When using the organic fiber cord as a reinforcing member, a spun organic fiber yarn is first twisted into an organic fiber cord. The organic fiber cord is then embedded in a rubber that coats the organic fiber cord using an adhesive composition and vulcanized to prepare an organic fiber-rubber composite, which can then be used as a reinforcing member for a rubber article such as a tire.

The material of the organic fibers is not limited, and example thereof can include an aliphatic polyamide fiber such as polyester, 6-nylon, 6,6-nylon, or 4,6-nylon, a protein fiber such as a synthetic fibroin fiber, an aromatic polyamide fiber such as a polyketone fiber, polynonamethylene terephthalamide, or paraphenylene terephthalamide, an acrylic fiber, a carbon fiber, and a fiber material represented by a cellulose fiber such as rayon or lyocell. Among them, polyester, 6-nylon, and 6,6-nylon are preferable, and polyester is especially preferable.

The polyester material is a polymer containing an ester bond in a main chain, and more specifically, a polymer in which 80% or more of the bonding style of the recurring units in a main chain is of the ester bonding style. Examples of the polyester include, without particular limitation, those obtained by condensation of a glycol such as ethylene glycol, propylene glycol, butylene glycol, methoxy polyethylene glycol, or pentaerythritol with a dicarboxylic acid such as terephthalic acid, isophthalic acid, or a dimethyl form thereof through an esterification reaction or an ester exchange reaction. The most representative polyester is polyethylene terephthalate.

The organic fiber cord is preferably an organic fiber cord obtained by twisting together a plurality of single-fiber filaments, especially for the purpose of reinforcing a rubber article such as a tire or a conveyor belt. The organic fiber cord is preferably an organic fiber cord obtained by twisting together a top-twisted single-fiber filament and a bottom-twisted single-fiber filament. In this case, it is more preferable that the twist coefficient of the bottom twist is from 1,300 to 2,500 and/or the twist coefficient of the top twist is from 900 to 1,800.

<<Coating Rubber Composition of Organic Fiber-Rubber Composite>>

A coating rubber composition constituting the organic fiber-rubber composite of the present invention is preferably one in which a rubber component is blended with a variety of blending agents usually used in the rubber industry. Here, the rubber component is not particularly limited, and examples thereof include natural rubber, as well as a conjugated diene synthetic rubber such as polyisoprene rubber (IR), polybutadiene rubber (BR), styrene-butadiene copolymer rubber (SBR), acrylonitrile-butadiene rubber (NBR), chloroprene rubber (CR), or butyl rubber (IIR), and furthermore, ethylene-propylene copolymer rubber (EPM), ethylene-propylene-diene copolymer rubber (EPDM), and polysiloxane rubber. Among them, natural rubber and conjugated diene synthetic rubber are preferable. These rubber components may be used singly, or two or more kinds thereof may be used in combination.

<<Production Method of Organic Fiber-Rubber Composite>>

The organic fiber-rubber composite can be produced by coating an organic fiber, such as an organic fiber cord, with the adhesive composition of the present invention to form an adhesive layer, and then co-vulcanizing the (A) rubber latex with unsaturated diene in the adhesive composition and a rubber component in a coating rubber composition which is an adherend of the organic fiber to form a bond.

A method of coating the organic fiber with the adhesive composition of the present invention is not particularly limited, and examples thereof include a method of dipping the organic fiber into the adhesive composition, a method of applying the adhesive composition to the organic fiber by brush or the like, and a method of spraying the adhesive composition on the organic fiber, and an appropriate method may be selected as necessary.

When coating the organic fiber with the adhesive composition, it is preferable to dissolve the adhesive composition in a variety of solvents to reduce the viscosity, which facilitates coating. It is environmentally preferable when a solvent used to reduce the viscosity of the adhesive composition is mainly composed of water.

The thickness of an adhesive layer with the adhesive composition is not particularly limited, and is preferably 50 μm or less, and more preferably from 0.5 μm to 30 μm.

In particular, when the organic fiber-rubber composite of the present invention is applied to tires, the adhesive durability under tire rolling tends to decrease as the amount of an adhesive composition adhered by an adhesive treatment increases. The reason for this is that the adhesive composition at the interface of a fiber material to be adhered to be relatively less deformed by bearing a stress due to strain because of the high rigidity of the fiber material, but the deformation due to strain increases as the distance from the interface increases. Compared to the adhered rubber material, the adhesive composition contains a larger amount of a thermosetting condensate, which is harder and more brittle, and is therefore more likely to cause greater adhesive fatigue under repeated strain. From the above, the average thickness of an adhesive composition layer is preferably 50 μm or less, and more preferably from 0.5 μm to 30 μm.

The concentration of an adhesive composition impregnated into the organic fiber is not particularly limited, and is, with respect to the mass of the organic fiber in terms of solid content, preferably from 5.0% by mass to 25.0% by mass, and more preferably from 7.5% by mass to 20.0% by mass.

An organic fiber coated with the adhesive composition can be dried, heat-treated, or the like, as in the case of the resin materials.

In the present invention, it is preferable that the organic fiber is a tire cord of 66 nylon with a twist structure of 1,400 dtex/2, a top twist count of 39 times/10 cm, and a bottom twist count of 39 times/10 cm, and the present invention is preferably an organic fiber-rubber composite in which the adhesive composition is attached to this tire cord.

Eventually, an organic fiber coated with the adhesive composition is bonded by co-vulcanizing a rubber latex containing the (A) unsaturated diene in the adhesive composition and a rubber component in a coating rubber composition which is an adherend of the organic fiber.

For co-vulcanization of a rubber component in the coating rubber composition, an organic vulcanizing agent such as sulfur, a tylarium polysulfide compound such as tetramethyl tylarium disulfide or dipentamethylenyl tylarium tetrasulfide, 4,4-dithiomorpholine, p-quinone dioxime, p,p'-dibenzoquinone dioxime, or cyclic sulfur imide can be used. Among them, sulfur is preferable. The rubber component in the coating rubber composition can be blended with a variety of blending agents usually used in the rubber industry, such as a filler such as carbon black, silica, or aluminum hydroxide, a vulcanization accelerator, an anti-aging agent, or a softener, as appropriate.

It is needless to say that the adhesive composition of the present invention is also effective for bonding in a bonding method in which a vulcanizing agent contained in an adherend of a synthetic resin material such as an organic fiber and/or a coating rubber composition is transferred to the adhesive composition and the adhesive composition is cross-linked by the migrated vulcanizing agent.

[Tire]

For the tire of the present invention, the organic fiber-rubber composite of the present invention is used. This allows a favorable adhesion property to be obtained without using resorcin, resulting in a tire with favorable environmental friendliness and workability.

Here, in the tire of the present invention, the organic fiber-rubber composite can be used, for example, as a carcass, a belt, a belt reinforcing layer, or a reinforcing layer around the belt, such as a flipper.

Depending on the type of a tire to be applied, the tire of the present invention may be obtained by using an unvulcanized rubber composition and vulcanizing the composition after molding, or by using a semi-vulcanized rubber that has undergone a pre-vulcanization process or the like for molding and then further vulcanizing the rubber. In the tire of the present invention, an organic fiber cord or the like treated with the adhesive composition described above is used in any part of the tire, and any other member of the tire is not particularly limited, and any known member can be used. The tire of the present invention is preferably a pneumatic tire, and as a gas to be filled into the pneumatic tire, normal or oxygen partial pressure-adjusted air as well as an inert gas such as nitrogen, argon, or helium can be used.

The adhesive compositions, resin materials, and organic fiber-rubber composites can be applied to any rubber article, such as a conveyor belt, a belt, a hose, or an air spring, in addition to the tire.

EXAMPLES

The present invention is described in more detail below with Examples, but the present invention is not limited in any way by the following Examples.

<(A-1) Synthetic Rubber Latex with Unsaturated Diene>

In the following Comparative Examples 1, 3 to 9 and Examples 1 to 9, vinylpyridine-styrene-butadiene copolymer latex was prepared and used as (A-1) a synthetic rubber latex with unsaturated diene, as described in Comparative Example 1 in JP H09-78045 as follows.

In a 5-liter capacity autoclave with nitrogen replacement, 130 parts by mass of deionized water and 4.0 parts by mass of potassium rosinate as an emulsifier were prepared and dissolved. To this, a monomer mixture of 15 parts by mass of vinylpyridine monomer, 15 parts by mass of styrene, and 70 parts by mass of butadiene, and 0.60 parts by mass of t-dodecyl mercaptan as a chain transfer agent were added and emulsified. The temperature was then raised to 50° C., and 0.5 mass part of potassium persulfate as a polymerization initiator was added, and polymerization was started. After the reaction rate of the monomer mixture reached 90%, 0.1 parts by mass of hydroquinone was added to stop the polymerization. Next, under reduced pressure, the unreacted monomer was removed to obtain vinylpyridine-styrene-butadiene copolymer latex with a solid concentration of 41% by mass.

<(A-2) Natural Rubber Latex>

In Comparative Example 2 and Example 10 below, a field latex with a solid concentration of 60% was used as (A-2) a natural rubber latex, which was adjusted to a solid concentration of 41% with deionized water.

<(B) Polylysine>

In the following Examples 1 to 10, the trade name "Polylysine 10" (solid concentration of 10%, aqueous solution) manufactured by ICHIMARU PHARCOS Co., Ltd. was used as it is as (B) polylysine.

<(C) Aqueous Compound with (Thermally Dissociable Blocked) Isocyanate Group>

In the following Comparative Example 4 and Example 4, DM-6400 (thermal dissociation temperature of blocking agent: about 130° C., solid concentration: 25% by mass), a product of Meisei Chemical Works, Ltd., a blocked form of (C-1) methylene diphenyl diisocyanate, was used as it is as (C) an aqueous compound with a (thermally dissociable blocked) isocyanate group.

In the following Comparative Example 3 and Examples 1 to 3, 10, trade name "ELASTRON BN77 (F-2955D-1)" ((C-2) aqueous urethane compound with a (thermally dissociable blocked) isocyanate group, thermal dissociation temperature of blocking agent: about 160° C., pH: 8.0, solid concentration: 31% by mass) manufactured by DKS Co. Ltd. was used as it is as the (C) aqueous compound with a (thermally dissociable blocked) isocyanate group.

<(D) Epoxide Compound>

In the following Comparative Example 5 and Example 5, DENACOL EX-614B (molecular weight: 949, epoxy equivalent weight: 173, solid concentration: 100% by mass) manufactured by Nagase ChemteX Corporation, a sorbitol polyglycidyl ether, as (D) an epoxide compound, was diluted with deionized water to an aqueous solution with a solid concentration of 10% by mass, and used for preparing an adhesive composition.

<(E) Polyphenol>

In the following Comparative Examples 6 to 9 and Examples 2, 6 to 9, as (E) a polyphenol, the following polyphenols were used: one in which the polyphenol is a kraft lignin (E-1), one in which the polyphenol is a lignin sulfonate (E-2), one in which the polyphenol is a hydrolyzed tannin (E-3), and one in which the polyphenol is a condensed tannin (E-4). These polyphenols were diluted with deionized water to produce an aqueous solution with a solid concentration of 5% by mass, which was used for preparing an adhesive composition.

(E-1) Product name "Lignin, alkali" (CAS Number: 8068-05-1), kraft lignin, manufactured by Sigma-Aldrich Co. LLC (E-2) Trade name "Lignin (alkali)" (CAS Number: 8061-51-6), partially desulfonated lignin sulfonate with a reduced degree of sulfonation, manufactured by Tokyo Kasei Kogyo Co.

(E-3) Reagent name "Tannic acid" (CAS Number: 1401-55-4-6, solid powder), tannic acid, manufactured by NACALAI TESQUE, INC.

(E-4) Trade name "Mimosa" (solid powder), tannin, manufactured by Kawamura Tsusho Co., Ltd.

<<Preparation of Latex Adhesive Compositions (Comparative Examples 1 and 2)>>

The (A) rubber latex and water were mixed by adjusting the amounts such that the solid concentration was 18% by mass, and then sufficiently stirred to obtain a latex adhesive composition. In Comparative Example 1 below, the (A-1) synthetic rubber latex with unsaturated diene was used, and in Comparative Example 2, the (A-2) natural rubber latex was used.

<<Preparation of Latex-Water-based Urethane Adhesive Composition (Comparative Examples 3 and 4)>>

The (A-1) synthetic rubber latex with unsaturated diene and the (C-1) aqueous compound with a (thermally dissociable blocked) isocyanate group were blended as shown in Table 3, and mixed by adjusting the amount with water such that the solid concentration of an adhesive composition was 18% by mass, and then thoroughly stirred to obtain a latex-water-based urethane adhesive composition (Comparative Example 3).

The (A-1) synthetic rubber latex with unsaturated diene and the (C-2) aqueous compound with a (thermally dissociable blocked) isocyanate group were blended as shown in Table 3, and mixed by adjusting the amount with water such that the solid concentration of an adhesive composition was 18% by mass, and then thoroughly stirred to obtain a latex-water-based urethane adhesive composition (Comparative Example 4).

<<Preparation of Latex-Epoxide Adhesive Composition (Comparative Example 5)

The (A-1) synthetic rubber latex with unsaturated diene and the (D) epoxide compound were blended as shown in Table 3, and mixed by adjusting the amount with water such that the solid concentration of an adhesive composition was 18% by mass, and then thoroughly stirred to obtain a latex-epoxide adhesive composition (Comparative Example 5).

<<Preparation of Latex-Polyphenol Adhesive Composition (Comparative Examples 6 to 9)

The (A-1) synthetic rubber latex with unsaturated diene and the (E) polyphenol were blended as shown in Tables 3 and 4, and mixed by adjusting the amount with water such that the solid concentration of an adhesive composition was 18% by mass, and then thoroughly stirred to obtain a latex-polyphenol adhesive composition (Comparative Examples 6-9).

<<Preparation of Adhesive Compositions (Examples 1 to 10) according to One Embodiment of the Invention>>

As shown in Tables 4 and 5, each of predetermined (A) rubber latex, (B) polylysine, (C) aqueous compound with a (thermally dissociable blocked) isocyanate group (Examples 1 to 4, 10), (D) epoxide compound (Example 5), and (E) polyphenol (Examples 2, 6 to 9) was blended in this order, the amount was adjusted with water such that the solid concentration of an adhesive composition was 18% by mass, and the mixture was thoroughly stirred to obtain adhesive compositions (Examples 1 to 10) according to one embodiment of the invention.

<Coating of Tire Cord with Adhesive Composition>

As an organic fiber cord, a tire cord made of polyethylene terephthalate with a twist structure of 1,670 dtex/2, a top twist count of 39 times/10 cm, and a bottom twist count of 39 times/10 cm was used.

The tire cords were dipped into the respective adhesive compositions of Comparative Examples 1 to 9 and Examples 1 to 10, such that the concentration of the adhesive composition impregnated into the tire cord was 3.8% by mass of the mass of the organic fiber cord. Next, tire cords coated with the adhesive compositions of Comparative Examples 1 to 9 and Examples 1 to 10 were successively subjected to drying in a drying zone (150° C., 60 s), thermosetting of the resin while applying tension (0.8 kg/pc) in a hot zone, and thermosetting while relaxing the tension (240° C., 60 s) in a normalizing zone.

<Preparation of Tire Cord-Rubber Composite>

Tire cords coated with the adhesive compositions of Comparative Examples 1 to 9 and Examples 1 to 10 were embedded in an unvulcanized rubber composition and co-vulcanized at 155° C. for 20 minutes. The unvulcanized rubber composition for coating was a rubber composition containing natural rubber, styrene-butadiene rubber, carbon black, a vulcanization chemical, and the like.

<<Evaluation of Anti-microbial Properties>>

The compositions (wet weight) shown in Table 2 were prepared and adjusted to a pH of from 7.0 to 7.5 using a phosphate buffer solution (pH 6.0) that is pH 6.0 of Tokyo Kasei Kogyo Co., Ltd. prepared in accordance with JIS K8001 for evaluating anti-microbial properties, and the liquid was left at a temperature of 30° C. for 10 days to observe alteration and odor on the surface of the adhesive composition. As the (A-2) natural rubber latex, the (B) polylysine, the (D) epoxide compound, and the (E-4) polyphenol, those as described above were used. As the (C-2) aqueous compound with a (thermally dissociable blocked) isocyanate group, the trade name "ELASTRON BN77 (F-2955D-1)" manufactured by DKS Co. Ltd. was used. The results are shown in Table 2. A "○" mark was assigned to those in which an anti-microbial effect was obtained, and an "x" mark was assigned to those in which no anti-microbial effect was obtained.

<Workability Evaluation of Adhesive Compositions >

The following evaluations were performed on the workability of the adhesive compositions in each of Comparative Examples and Examples.

<<Evaluation of Mechanical Stability (Solidification Rate)>>

The mechanical stability (solidification rate) of each adhesive composition was measured in accordance with a method using a Maron Mechanical Stability Tester for Copolymer Latex Compositions (Maron Stability Tester No. 2312-II, manufactured by KUMAGAI RIKI KOGYO Co., Ltd.) as specified in JIS K6392-1995.

In general, each adhesive composition was subjected to shear strain for 10 minutes at a compression load of 10 kg and a rotation rate of 1,000 r/min using a rotor of the Maron Mechanical Stability Tester, and the solidification rate (%) was evaluated from the amount of solidification generated using the following formula and rounded to one decimal place. The smaller the numerical value is, the more excellent the mechanical stability is.

$$\text{Solidification rate (\%)}=[(\text{dry mass of solidified product generated})/(\text{mass of solid content of adhesive liquid in test})]\times 100$$

<<Evaluation of Adhesion to Squeezing Roll>>

The polyethylene terephthalate tire cords, which are organic fiber cords, were continuously processed for 2,000 m in a dipping processor that stores each adhesive composition, and the amount of each adhesive composition on the squeezing roll was visually evaluated in the following five levels:

Extra-large: Particularly large amount;
Large: Large amount;
Medium: Moderate amount;
Small: Small amount; and
Slight: Very small amount.

<Adhesion Evaluation of Adhesive Compositions >

The following evaluations were performed on the adhesive properties of the adhesive compositions of Comparative Examples and Examples.

<<Evaluation of Adhesive Strength>>

The tire cord-rubber composite obtained by using each adhesive composition was peeled off from the tire cord-rubber composite by pulling at a speed of 300 mm/min, and the peel drag force per tire cord was determined, which was used as the adhesive strength (N/pc).

<<Evaluation of Adhesion Condition of Coating Rubber>>

The tire cords peeled from the tire cord-rubber composite were visually observed for adhesion of the coating rubber and scored according to Table 1 below.

TABLE 1

| Score of adhesion condition of coating rubber | Adhesion area ratio of coating rubber to tire cord (organic fiber cord) | Condition of cord filament |
|---|---|---|
| A+ | — | Filament is broken |
| A | from 80% to 100% | Filament is not broken |
| B | from 60% to less than 80% | Filament is not broken |
| C | from 40% to less than 60% | Filament is not broken |
| D | from 20% to less than 40% | Filament is not broken |
| E | from 0% to less than 20% | Filament is not broken |

<Results of Workability Evaluation and Adhesion Evaluation of Adhesive Compositions >

Each formulation of the adhesive composition for each Comparative Example and Example is shown in Tables 3 to 5 below, and the results of workability evaluation and adhesiveness evaluation are shown in Tables 6 and 7 below.

TABLE 2

| | (A-2) Natural rubber latex (solid content 60% by mass) | (B) Polylysine (solid content 10% by mass) | Other compounds | Adjusted pH | Observation after 30° C. × 10 days | Anti-microbial effect |
|---|---|---|---|---|---|---|
| Comparative Example A | 100 g | None | None | 7.0 to 7.1 | Surface altered film present, odor present | x |
| Example A | 100 g | 3 g | None | | No surface altered film, no particular odor | ○ |
| Comparative Example B | 100 g | None | (C-2) Aqueous compound with (thermally dissociable blocked) isocyanate group | | Surface altered film present, odor present | x |
| Example B | 100 g | 3 g | (solid content 10% by mass) 15 g | | No altered film, no particular odor | ○ |

TABLE 2-continued

| | (A-2) Natural rubber latex (solid content 60% by mass) | (B) Polylysine (solid content 10% by mass) | Other compounds | Adjusted pH | Observation after 30° C. × 10 days | Anti-microbial effect |
|---|---|---|---|---|---|---|
| Comparative Example C | 100 g | None | (D) Epoxide compound (solid content 10% by mass) 15 g | | Surface altered film present, odor present | x |
| Example C | 100 g | 3 g | | | No surface altered film, no particular odor | ○ |
| Comparative Example D | 100 g | None | (E-4) Polyphenol (solid content 5% by mass) 10 g | | Surface altered film present, odor present | x |
| Example D | 100 g | 3 g | | | No surface altered film, no particular odor | ○ |

TABLE 3

| | | Component | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|---|
| Composition of solid component of adhesive composition (% by mass) | (A-1) | Vinylpyridine latex *A1 | 100.0 | — | 66.0 | 66.0 | 78.0 | 85.0 | 85.0 |
| | (A-2) | Natural rubber latex *A2 | — | 100.0 | — | — | — | — | — |
| | (B) | Polylysine *B1 | — | — | — | — | — | — | — |
| | (C-1) | Aqueous compound with (thermally dissociable blocked) isocyanate group *C1 | — | — | — | 34.0 | — | — | — |
| | (C-2) | Aqueous compound with (thermally dissociable blocked) isocyanate group *C2 | — | — | 34.0 | — | — | — | — |
| | (D) | Epoxide compound *D1 | — | — | — | — | 22.0 | — | — |
| | (E-1) | Polyphenol *E1 | — | — | — | — | — | 15.0 | — |
| | (E-2) | Polyphenol *E2 | — | — | — | — | — | — | 15.0 |
| | (E-3) | Polyphenol E3 | — | — | — | — | — | — | — |
| | (E-4) | Polyphenol *E4 | — | — | — | — | — | — | — |
| Composition of adhesive composition in solution (% by mass) | (A-l) | Vinylpyridine latex *A1 | 43.90 | — | 28.98 | 28.98 | 34.24 | 37.32 | 37.32 |
| | (A-2) | Natural rubber latex *A2 | — | 43.90 | — | — | — | — | — |
| | (B) | Polylysine *B1 | — | — | — | — | — | — | — |
| | (C-1) | Aqueous compound with (thermally dissociable blocked) isocyanate group *C1 | — | — | — | 24.48 | — | — | — |
| | (C-2) | Aqueous compound with (thermally dissociable blocked) isocyanate group *C2 | — | — | 19.74 | — | — | — | — |
| | (D) | Epoxide compound *D1 | — | — | — | — | 39.60 | — | — |
| | (E-1) | Polyphenol *E1 | — | — | — | — | — | 54.00 | — |
| | (E-2) | Polyphenol *E2 | — | — | — | — | — | — | 54.00 |
| | (E-3) | Polyphenol *E3 | — | — | — | — | — | — | — |
| | (E-4) | Polyphenol *E4 | — | — | — | — | — | — | — |
| | Water | | 56.10 | 56.10 | 51.28 | 46.54 | 26.16 | 8.68 | 8.68 |

*A1 Vinylpyridine latex: Vinylpyridine-styrene-butadiene copolymer latex synthesized by the above-described method (solid concentration 41% by mass)

*A2 Natural rubber latex: Field latex (solid concentration 41%)

*B1 Polylysine: Trade name “Polylysine 10” (solid concentration 10%, aqueous solution), weight average molecular weight 5,000, manufactured by ICHIMARU PHARCOS Co., Ltd.

*C1 Aqueous compound with (thermally dissociable blocked) isocyanate group: Trade name “DM-6400” (thermal dissociation temperature of blocking agent: about 130° C., solid concentration 25% by mass) blocked methylene diphenyl diisocyanate, manufactured by Meisei Chemical Works, Ltd.

*C2 Aqueous compound with (thermally dissociable blocked) isocyanate group: Trade name “ELASTRON BN77 (F-2955D-1)” (thermal dissociation temperature of blocking agent: about 160° C., pH 8.0, solid concentration 31% by mass) Aqueous urethane compound with (thermal dissociable blocked) isocyanate group, manufactured by DKS Co. Ltd.

*D1 Epoxide compound: Trade name “DENACOL EX-614B” (molecular weight 949, epoxy equivalent 173, solid concentration 10% by mass), sorbitol polyglycidyl ether, manufactured by Nagase ChemteX Corporation

*E1 Polyphenol: Product name “Lignin, alkali” (CAS Number 8068-05-1), Kraft lignin, manufactured by Sigma-Aldrich Co. LLC

*E2 Polyphenol: Trade name “Lignin (alkali)” (CAS Number: 8061-51-6), partially desulfonated lignin sulfonate with a reduced degree of sulfonation, manufactured by Tokyo Kasei Kogyo Co.

*E3 Polyphenol: Reagent name “Tannic acid” (CAS Number: 1401-55-4-6, solid powder) Tannic acid, manufactured by NACALAI TESQUE, INC.

*E4 Polyphenol: Trade name “Mimosa” (solid powder) tannin, manufactured by Kawamura Tsusho Co., Ltd.

TABLE 4

| | | Component | Comparative Example 8 | Comparative Example 9 | Example 1 | Example 2 | Example 3 | Example 4 | Example 5 |
|---|---|---|---|---|---|---|---|---|---|
| Composition of solid component of adhesive composition (% by mass) | (A-1) | Vinylpyridine latex *A1 | 85.0 | 85.0 | 65.1 | 65.1 | 65.0 | 65.1 | 77.1 |
| | (A-2) | Natural rubber latex *A2 | — | — | — | — | — | — | — |
| | (B) | Polylysine *B1 | — | — | 0.90 | 0.90 | 11.00 | 0.90 | 0.90 |
| | (C-1) | Aqueous compound (thermally dissociable blocked) isocyanate group *C1 | — | — | — | — | — | 34.0 | — |
| | (C-2) | Aqueous compound (thermally dissociable blocked) isocyanate group *C2 | — | — | 34.0 | 24.0 | 24.0 | — | — |
| | (D) | Epoxide compound *D1 | — | — | — | — | — | — | 22.0 |
| | (E-1) | Polyphenol *E1 | — | — | — | 10.0 | — | — | — |
| | (E-2) | Polyphenol *E2 | — | — | — | — | — | — | — |
| | (E-3) | Polyphenol *E3 | 15.0 | — | — | — | — | — | — |
| | (E-4) | Polyphenol *E4 | — | 15.0 | — | — | — | — | — |
| Composition of adhesive composition in solution (% by mass) | (A-1) | Vinylpyridine latex *A1 | 37.32 | 37.32 | 28.58 | 28.58 | 28.54 | 28.58 | 33.85 |
| | (A-2) | Natural rubber latex *A2 | — | — | — | — | — | — | — |
| | (B) | Polylysine *E1 | — | — | 1.62 | 1.62 | 19.80 | 1.62 | 1.62 |
| | (C-1) | Aqueous compound (thermally dissociable blocked) isocyanate group *C1 | — | — | — | — | — | 24.48 | — |
| | (C-2) | Aqueous compound (thermally dissociable blocked) isocyanate group *C2 | — | — | 19.74 | 13.94 | 13.94 | — | — |
| | (D) | Epoxide compound *D1 | — | — | — | — | — | — | 3.96 |
| | (E-1) | Polyphenol *E1 | — | — | — | 36.00 | — | — | — |
| | (E-2) | Polyphenol *E2 | — | — | — | — | — | — | — |
| | (E-3) | Polyphenol *E3 | 54.00 | — | — | — | — | — | — |
| | (E-4) | Polyphenol *E4 | — | 54.00 | — | — | — | — | — |
| | Water | | 8.68 | 8.68 | 50.06 | 19.86 | 37.73 | 45.32 | 60.57 |

TABLE 5

| | | Component | Example 6 | Example 7 | Example 8 | Example 9 | Example 10 |
|---|---|---|---|---|---|---|---|
| Composition of solid component of adhesive composition (% by mass) | (A-1) | Vinylpyridine latex *A1 | 84.1 | 84.1 | 89.1 | 84.1 | — |
| | (A-2) | Natural rubber latex *A2 | — | — | — | — | 65.0 |
| | (B) | Polylysine *B1 | 0.90 | 0.90 | 0.90 | 0.90 | 0.90 |
| | (C-1) | Aqueous compound with (thermally dissociable blocked) isocyanate group *C1 | — | — | — | — | — |
| | (C-2) | Aqueous compound (thermally dissociable blocked) isocyanate group *C2 | — | — | — | — | 34.0 |
| | (D) | Epoxide compound *D1 | — | — | — | — | — |
| | (E-1) | Polyphenol *E1 | 15.0 | — | — | — | — |
| | (E-2) | Polyphenol *E2 | — | 15.0 | — | — | — |
| | (E-3) | Polyphenol *E3 | — | — | 10.0 | — | — |
| | (E-4) | Polyphenol *E4 | — | — | — | 15.0 | — |
| Composition of adhesive composition in solution (% by mass) | (A-1) | Vinylpyridine latex *A1 | 36.92 | 36.92 | 39.12 | 36.92 | — |
| | (A-2) | Natural rubber latex *A2 | — | — | — | — | 28.54 |
| | (B) | Polylysine *B1 | 1.62 | 1.62 | 1.62 | 1.62 | 1.62 |
| | (C-1) | Aqueous compound with (thermally dissociable blocked) isocyanate group *C1 | | | | | |
| | (C-2) | Aqueous compound with (thermally dissociable blocked) isocyanate group *C2 | | | | | 61.20 |

TABLE 5-continued

| Component | | Example 6 | Example 7 | Example 8 | Example 9 | Example 10 |
|---|---|---|---|---|---|---|
| (D) | Epoxide compound *D1 | — | — | — | — | — |
| (E-1) | Polyphenol *E1 | 54.00 | — | — | — | — |
| (E-2) | Polyphenol *E2 | — | 54.00 | — | — | — |
| (E-3) | Polyphenol *E3 | — | — | 36.00 | — | — |
| (E-4) | Polyphenol *E4 | — | — | — | 54.00 | — |
| Water | | 7.46 | 7.46 | 23.26 | 7.46 | 8.64 |

TABLE 6

| | | Comparative Example 1 | Comparative Example 2 | Comparative Example 3 | Comparative Example 4 | Comparative Example 5 | Comparative Example 6 | Comparative Example 7 | Comparative Example 8 | Comparative Example 9 |
|---|---|---|---|---|---|---|---|---|---|---|
| Solid concentration of adhesive composition (% by mass) | | 18.0 | 18.0 | 18.0 | 18.0 | 18.0 | 18.0 | 18.0 | 18.0 | 18.0 |
| Results of workability evaluation | Solidification rate (%) | 8.5 | 10.6 | 6.3 | 7.2 | 7.5 | 8.9 | 8.1 | 9.7 | 8.8 |
| | Adhesion to squeezing roll | Extra-large | Extra-large | Large | Large | Extra-large | Extra-large | Extra-large | Extra-large | Extra-large |
| Result of adhesion evaluation | Adhesive strength (N/piece) | 3.86 | 3.02 | 5.76 | 5.50 | 6.32 | 3.70 | 3.50 | 4.10 | 4.00 |
| | Adhesion condition of rubber | E | E | E | E | D | E | E | E | E |

TABLE 7

| | | Example 1 | Example 2 | Example 3 | Example 4 | Example 5 | Example 6 | Example 7 | Example 8 | Example 9 | Example 10 |
|---|---|---|---|---|---|---|---|---|---|---|---|
| Solid concentration of adhesive composition (% by mass) | | 18.0 | 18.0 | 18.0 | 18.0 | 18.0 | 18.0 | 18.0 | 18.0 | 18.0 | 18.0 |
| Result of workability evaluation | Solidification rate (%) | 3.1 | 3.5 | 2.2 | 4.8 | 3.2 | 3.0 | 2.5 | 2.9 | 2.4 | 3.7 |
| | Adhesion to squeezing roll | Small | Medium | Small | Medium | Medium | Small | Small | Small | Small | Small |
| Result of adhesion evaluation | Adhesive strength (N/piece) | 18.60 | 21.20 | 17.20 | 15.90 | 16.20 | 9.04 | 10.40 | 11.12 | 12.10 | 15.82 |
| | Adhesion condition of rubber | A | A+ | A | B | A | C | C | A | A+ | A+ |

Table 2 shows that addition of the (B) polylysine to the (A) rubber latex increases the usable period as an adhesive due to the anti-microbial action of the adhesive composition.

Tables 6 and 7 show that in each of Examples, an adhesive composition with favorable workability and a favorable adhesion property between an organic fiber and a coating rubber composition was obtained.

INDUSTRIAL APPLICABILITY

According to the present invention, an adhesive composition that can ensure a desired adhesion property without using resorcin and that does not impair workability during use, as well as a resin material, a rubber article, an organic fiber-rubber composite, and a tire using the adhesive composition can be provided. Therefore, the present invention can be used in the industrial field of producing rubber articles such as tires.

DESCRIPTION OF SYMBOLS

1: Organic fiber cord
2: Adhesive composition
3: Dipping bath (dipping tank)
4: Organic fiber cord coated with adhesive composition
5: Squeezing roll
6: Drying zone
7: Hot zone
8: Normalizing zone
11: Synthetic rubber latex with unsaturated diene
12: Polylysine

13: Urethane resin formed by aqueous urethane compounds with (thermally dissociable blocked) isocyanate group
14: Activated isocyanate group
15: Portion easily interacted with organic fiber cord
16: Portion difficult to diffuse into organic fiber cord
20: Latex-polylysine protective film effect
21: Rubber co-vulcanization adhesion
22: Polylysine isocyanate cross-linking
23: Activated isocyanate cross-linking
24: Aqueous urethane-organic fiber interfacial effect
31: Organic fiber-rubber composite
32: Adhesive layer by adhesive composition
33: Coating rubber composition
40: Water-dispersible (thermally dissociable blocked) isocyanate compound composed of addition product of polyisocyanate with aromatic ring and blocking agent with one or more active hydrogen groups
41: Aromatic isocyanate-Organic fiber diffusion effect

The invention claimed is:

1. An adhesive composition comprising (A) a rubber latex with unsaturated diene, (B) polylysine and (C) an aqueous compound with a thermally dissociable blocked isocyanate group, wherein the (C) aqueous compound with the thermally dissociable blocked isocyanate group is (C-1) a water-dispersible thermally dissociable blocked isocyanate compound composed of an addition product of a polyisocyanate with an aromatic ring and a blocking agent with one or more active hydrogen groups, or (C-2) an aqueous urethane compound with a thermally dissociable blocked isocyanate group.

2. The adhesive composition according to claim 1, further comprising at least one compound selected from the group consisting of the following (D) and (E):

(D) an epoxide compound; and
(E) a polyphenol.

3. The adhesive composition according to claim 1, wherein the (C-1) water-dispersible thermally dissociable blocked isocyanate compound composed of the addition product of the polyisocyanate with the aromatic ring and the blocking agent with the one or more active hydrogen groups is a blocked methylene diphenyl diisocyanate.

4. The adhesive composition according to claim 1, wherein the (C-2) aqueous urethane compound with the thermally dissociable blocked isocyanate group is a reaction product after mixing and reacting (α) an organic polyisocyanate compound containing from 3 to 5 functional groups and having a number-average molecular weight of 2,000 or less,
(β) a compound containing from 2 to 4 active hydrogen groups and having a number-average molecular weight of 5,000 or less,
(γ) a thermally dissociable blocking agent, and
(δ) a compound containing at least one active hydrogen group and at least one hydrophilic group that is anionic, cationic, or nonionic such that each mixing ratio of (α), (β), (γ), and (δ) to the total amount of (α), (β), (γ), and (δ) is from 40% by mass to 85% by mass for (α),
from 5% by mass to 35% by mass for (β),
from 5% by mass to 35% by mass for (γ), and
from 5% by mass to 35% by mass for (δ), and the composition ratio of the thermally dissociable blocked isocyanate group in the reaction product, where the molecular weight of the isocyanate group (—NCO) is 42, is from 0.5% by mass to 11% by mass.

5. The adhesive composition according to claim 1, wherein the (C-2) aqueous urethane compound with the thermally dissociable blocked isocyanate group is represented by general formula (1):

$$[(YCONH)_p - \underset{}{\overset{(NHCOZ)_m}{\overset{|}{A}}} - NHCO]_n - X \qquad (1)$$

[where

A represents a residue of an organic polyisocyanate compound from which an active hydrogen group has been removed, X represents a residue of a polyol compound containing from 2 to 4 hydroxyl groups and having a number-average molecular weight of 5,000 or less, from which an active hydrogen group has been removed, Y represents a residue of a thermally dissociable blocking agent from which an active hydrogen group has been removed, Z represents a residue of a compound containing at least one active hydrogen group and at least one salt-forming group or a hydrophilic polyether chain from which an active hydrogen group has been removed, n represents an integer from 2 to 4, and p+m represents an integer from 2 to 4 (m≥0.25)].

6. The adhesive composition according to claim 2, wherein the (D) epoxide compound contains two or more epoxy groups per molecule.

7. The adhesive composition according to claim 2, wherein the (D) epoxide compound is a reaction product of a polyhydric alcohol and epichlorohydrin.

8. The adhesive composition according to claim 2, wherein the (E) polyphenol is a plant-derived compound containing a plurality of phenolic hydroxy groups in the molecule.

9. The adhesive composition according to claim 2, wherein the (E) polyphenol is a lignin, a tannin, a tannic acid, a flavonoid, or a derivative thereof.

10. The adhesive composition according to claim 1 not comprising resorcin.

11. A resin material comprising a resin base material and an adhesive layer coating a surface of the resin base material, wherein the adhesive layer consists of the adhesive composition according to claim 1.

12. The resin material according to claim 11, wherein the resin base material is composed of polyester resin.

13. The resin material according to claim 11, wherein the resin base material is a cord obtained by twisting a plurality of filaments.

14. The resin material according to claim 13, wherein the cord contains a final twist and a first twist, with a twist coefficient of from 1,300 to 2,500 for the first twist and from 900 to 1,800 for the final twist.

15. The resin material according to claim 13, wherein the dry weight of the adhesive layer is from 0.5 to 6.0% by mass of the mass of the cord.

16. A rubber article being reinforced by the resin material according to claim 11.

17. An organic fiber-rubber composite being a composite of organic fiber and rubber, wherein the organic fiber is coated with the adhesive composition according to claim 1.

18. A tire using the organic fiber-rubber composite according to claim 17.

* * * * *